(12) United States Patent
Imboden et al.

(10) Patent No.: US 9,132,058 B2
(45) Date of Patent: *Sep. 15, 2015

(54) RECHARGEABLE PERSONAL MASSAGER

(75) Inventors: Ethan F. Imboden, San Francisco, CA (US); Roland J. Wyatt, Bozeman, MT (US)

(73) Assignee: LELO Inc., San Jose, CA (US)

( * ) Notice: Subject to any disclaimer, the term of this patent is extended or adjusted under 35 U.S.C. 154(b) by 1231 days.

This patent is subject to a terminal disclaimer.

(21) Appl. No.: 11/971,835

(22) Filed: Jan. 9, 2008

(65) Prior Publication Data

US 2008/0306417 A1    Dec. 11, 2008

Related U.S. Application Data

(63) Continuation-in-part of application No. 11/344,987, filed on Feb. 1, 2006, now Pat. No. 7,749,178.

(60) Provisional application No. 60/879,440, filed on Jan. 9, 2007.

(51) Int. Cl.
  *A61H 1/00* (2006.01)
  *A61H 19/00* (2006.01)
  *A61H 23/02* (2006.01)

(52) U.S. Cl.
  CPC .............. *A61H 19/00* (2013.01); *A61H 19/40* (2013.01); *A61H 23/0263* (2013.01); *A61H 2201/0111* (2013.01); *A61H 2201/0153* (2013.01)

(58) Field of Classification Search
  CPC ... A61H 19/00; A61H 19/44; A61H 23/0263; A61H 21/00; A61H 19/40; A61H 2201/5097; A61H 2201/0153; A61H 2201/011; A61H 2230/425; A61H 2230/255; A61H 2201/0134; A61H 2201/0149; A61H 2201/0207; A61H 2201/0221; A61H 2201/0228; A61H 2201/0278; A61H 2201/0292; A61H 2201/1609; A61H 2201/1623; A61H 2201/164; A61H 2201/169; A61H 2201/5005; A61H 2201/2015; A61H 2201/5064; A61H 2201/5084; A61H 2205/081; A61H 2205/12; A61H 2205/06; A63B 2225/66
  USPC ........... 601/46, 72, 73, 74, 80, 135, 137, 138; 320/108, 128; 30/541
  See application file for complete search history.

(56) References Cited

U.S. PATENT DOCUMENTS 1,636,159 A    7/1927 Unne
3,504,665 A    4/1970 Bakunin et al.
(Continued)

FOREIGN PATENT DOCUMENTS

CA    2491249 A1    6/2006
DE    3316100 A1    11/1984
(Continued)

OTHER PUBLICATIONS

Office Action dated Mar. 23, 2010 for Chinese Application No. 200780004386.1.
(Continued)

*Primary Examiner* — Quang D Thanh
(74) *Attorney, Agent, or Firm* — Fenwick & West LLP

(57) ABSTRACT

A personal massage device is disclosed. The massage device includes a housing having an exterior surface defining first and second oppositely-disposed operative ends and an interior surface defining a cavity. Each of the operative ends includes a substantially smooth and continuous surface thereon. The massage device further includes a first motor disposed within the housing and adapted for creating vibration and a battery disposed within the housing and adapted to power the first motor.

57 Claims, 17 Drawing Sheets

(56) References Cited

U.S. PATENT DOCUMENTS

| | | | |
|---|---|---|---|
| 3,554,184 A | 1/1971 | Habib | |
| 3,626,931 A | 12/1971 | Bysakh | |
| 3,699,952 A | 10/1972 | Waters et al. | 128/24.2 |
| 3,705,575 A | 12/1972 | Edwards | |
| 3,938,018 A | 2/1976 | Dahl | |
| 3,996,930 A | 12/1976 | Sekulich | |
| 4,149,530 A * | 4/1979 | Gow | 601/72 |
| D273,132 S | 3/1984 | Moloff | |
| 4,574,791 A | 3/1986 | Mitchener | |
| 4,800,328 A | 1/1989 | Bolger et al. | |
| 4,878,489 A * | 11/1989 | Kamayachi | 601/72 |
| 5,176,130 A * | 1/1993 | Kim | 601/15 |
| 5,336,159 A * | 8/1994 | Cheng | 601/15 |
| 5,413,551 A * | 5/1995 | Wu | 601/46 |
| 5,460,597 A | 10/1995 | Hopper | |
| D366,703 S | 1/1996 | Huen | D24/214 |
| 5,690,603 A | 11/1997 | Kain | |
| 5,713,833 A | 2/1998 | Milligan | |
| 5,797,950 A | 8/1998 | Takashima | |
| 5,853,362 A | 12/1998 | Jacobs | |
| 5,857,986 A | 1/1999 | Moriyasu | 60/49 |
| 5,871,533 A | 2/1999 | Boutos | |
| 5,894,670 A | 4/1999 | Iso et al. | 30/541 |
| 5,925,002 A | 7/1999 | Wollman | |
| 5,929,598 A | 7/1999 | Nakama | |
| D414,582 S | 9/1999 | Hwang | D28/9 |
| 5,951,500 A | 9/1999 | Cutler | 601/47 |
| 5,956,484 A | 9/1999 | Rosenberg et al. | 395/200.33 |
| 5,966,821 A * | 10/1999 | Armbruster et al. | 30/537 |
| 6,001,070 A * | 12/1999 | Gebhard | 601/15 |
| 6,027,463 A | 2/2000 | Moriyasu | 601/46 |
| 6,028,531 A | 2/2000 | Wanderlich | 340/825.44 |
| 6,053,881 A | 4/2000 | Boodramsingh et al. | |
| 6,132,366 A | 10/2000 | Ritchie et al. | |
| 6,179,775 B1 | 1/2001 | Thompson | |
| 6,183,426 B1 | 2/2001 | Akisada et al. | |
| 6,190,307 B1 | 2/2001 | Tsai | |
| 6,217,533 B1 | 4/2001 | McCambridge | |
| 6,234,986 B1 * | 5/2001 | Raffo et al. | 601/72 |
| 6,312,397 B1 * | 11/2001 | Gebhard | 601/15 |
| 6,350,230 B1 | 2/2002 | Kontos | |
| 6,368,268 B1 | 4/2002 | Sandvick et al. | 600/38 |
| 6,432,071 B1 * | 8/2002 | Hsieh | 601/72 |
| D475,793 S | 6/2003 | Tinsley | D24/214 |
| 6,572,569 B2 | 6/2003 | Klein | |
| 6,685,660 B1 | 2/2004 | Taverna et al. | |
| 6,741,895 B1 | 5/2004 | Gafni et al. | |
| D509,301 S | 9/2005 | Talbot et al. | D24/215 |
| D510,628 S | 10/2005 | Talbot et al. | D24/215 |
| 7,001,317 B2 | 2/2006 | Marcotte | |
| 7,026,789 B2 * | 4/2006 | Bozzone et al. | 320/108 |
| 7,081,087 B2 | 7/2006 | Jannuzzi | |
| 7,083,581 B2 * | 8/2006 | Tsai | 601/15 |
| 7,166,072 B2 | 1/2007 | Smith | |
| 7,169,120 B2 * | 1/2007 | Murdock et al. | 601/129 |
| D549,350 S | 8/2007 | Wu | D24/215 |
| 7,282,036 B2 * | 10/2007 | Masuda | 601/72 |
| 7,438,681 B2 | 10/2008 | Kobashikawa et al. | 600/38 |
| 7,577,476 B2 | 8/2009 | Hochman | |
| D605,779 S | 12/2009 | Murison | |
| 7,733,056 B2 * | 6/2010 | Hartung et al. | 320/114 |
| 7,815,582 B2 | 10/2010 | Imboden et al. | |
| 7,931,605 B2 | 4/2011 | Murison | |
| 7,938,789 B2 | 5/2011 | Imboden et al. | |
| 7,946,977 B2 * | 5/2011 | Klearman et al. | 600/38 |
| 2002/0065477 A1 | 5/2002 | Boyd et al. | |
| 2002/0095103 A1 | 7/2002 | Blue | 601/46 |
| 2002/0103415 A1 | 8/2002 | Manska et al. | |
| 2002/0133103 A1 | 9/2002 | Williams et al. | 601/46 |
| 2002/0156402 A1 | 10/2002 | Woog et al. | 601/46 |
| 2002/0188233 A1 | 12/2002 | Denyes | |
| 2003/0023139 A1 | 1/2003 | Hartz | |
| 2003/0073881 A1 | 4/2003 | Levy | |
| 2003/0097041 A1 | 5/2003 | Ritchie et al. | |
| 2003/0103088 A1 | 6/2003 | Dresti et al. | 345/835 |
| 2003/0195441 A1 | 10/2003 | Firouzgar | |
| 2004/0034315 A1 * | 2/2004 | Chen | 601/72 |
| 2004/0068213 A1 | 4/2004 | Fujisawa | 601/70 |
| 2004/0132439 A1 | 7/2004 | Tyagi et al. | 455/419 |
| 2004/0186344 A1 | 9/2004 | Januzzi | |
| 2004/0193079 A1 * | 9/2004 | Siddhartha | 601/72 |
| 2004/0230093 A1 | 11/2004 | Marshall | |
| 2005/0004429 A1 | 1/2005 | Tracanna | 600/38 |
| 2005/0027794 A1 | 2/2005 | Decker | 709/201 |
| 2005/0054450 A1 | 3/2005 | Yamaguchi | 463/58 |
| 2005/0075072 A1 | 4/2005 | Apitzsch | |
| 2005/0090768 A1 | 4/2005 | Brattesani et al. | 601/70 |
| 2005/0203335 A1 | 9/2005 | Stachon | |
| 2005/0203448 A1 * | 9/2005 | Harris et al. | 601/72 |
| 2005/0268472 A1 | 12/2005 | Bourilkov et al. | 30/537 |
| 2005/0273024 A1 | 12/2005 | Nan | |
| 2006/0058714 A1 | 3/2006 | Rhoades | 601/73 |
| 2006/0278514 A1 | 12/2006 | Roussin-Bouchard | |
| 2007/0055096 A1 | 3/2007 | Berry et al. | 600/38 |
| 2007/0118058 A1 * | 5/2007 | Isshiki | 601/70 |
| 2007/0179412 A1 | 8/2007 | Imboden et al. | 601/72 |
| 2007/0179413 A1 | 8/2007 | Imboden et al. | |
| 2008/0009775 A1 * | 1/2008 | Murison | 601/46 |
| 2008/0154161 A1 * | 6/2008 | Abbott | 601/113 |
| 2008/0191648 A1 | 8/2008 | Ito et al. | |
| 2011/0071445 A1 | 3/2011 | Imboden et al. | |

FOREIGN PATENT DOCUMENTS

| | | |
|---|---|---|
| DE | 103 52 219 | 6/2005 |
| DE | 20 2005 015 767 | 1/2006 |
| EP | 1477149 A1 | 11/2004 |
| GB | 2376890 B | 11/2004 |
| GB | 2375714 B | 12/2004 |
| JP | H06-24356 U | 3/1994 |
| JP | 3002397 U | 9/1994 |
| JP | 3046372 U | 3/1998 |
| JP | 2003-070866 A | 3/2003 |
| JP | 2004-290297 A | 10/2004 |
| JP | 2004-313690 A | 11/2004 |
| JP | 2004-344339 A | 12/2004 |
| JP | 2005-137895 A | 6/2005 |
| JP | 2005-288079 A | 10/2005 |
| WO | WO 98/51255 A1 | 11/1998 |
| WO | WO 99/37267 | 7/1999 |
| WO | WO 99/37267 A1 | 7/1999 |
| WO | WO 02/38100 A2 | 5/2002 |
| WO | WO 03/089071 A2 | 10/2003 |
| WO | WO 2004/069128 | 8/2004 |
| WO | WO 2006/063461 A1 | 6/2006 |

OTHER PUBLICATIONS

International Search Report of PCT/US07/02259 & Written Opinion of PCT/US07/02259, Partial International Search Report of PCT/US2008/050641.

International Search Report and Written Opinion of the International Searching Authority, Application No. PCT/US07/02259, mailed Dec. 17, 2007.

Partial International Search Results, Application No. PCT/US2008/050641, mailed Apr. 28, 2008.

International Search Report and Written Opinion of the International Searching Authority, Application No. PCT/US2008/050641, mailed Jun. 16, 2008.

Japanese Patent Office, Office Action, Japanese Patent Application No. 2012-223456, Sep. 25, 2013, five pages.

U.S. Patent and Trademark Office, Patent Trial and Appeal Board in re U.S. Pat. No. 7,749,178, Petition for Inter Partes Review and Exhibits 1001-1011, Nov. 13, 2013, 387 pages.

Korean Intellectual Property Office, Office Action, Korean Patent Application No. 10-2013-7027819, Feb. 19, 2014, five pages.

Korean Intellectual Property Office, Office Action, Korean Patent Application No. 10-2013-7027819, May 30, 2014, five pages.

U.S. Patent and Trademark Office, Patent Trial and Appeal Board in re U.S. Pat. No. 7,749,178, Decision, Institution of Inter Partes Review, and Exhibit 3001, May 6, 2014, twenty-eight pages.

(56) References Cited

OTHER PUBLICATIONS

U.S. Patent and Trademark Office, Patent Trial and Appeal Board in re U.S. Pat. No. 7,749,178, Declaration of Dr. James L. Kirtley, Jr. and Appendices A and B, Jun. 5, 2014, two hundred fourteen pages.
U.S. Patent and Trademark Office, Patent Trial and Appeal Board in re U.S. Pat. No. 7,749,178, Petitioner's Motion to Join and/or Consolidate Proceedings Pursuant to 35 U.S.C. § 315(c) and/or (d) and 37 C.F.R. § 42.122, Jun. 5, 2014, sixteen pages.
U.S. Patent and Trademark Office, Patent Trial and Appeal Board in re U.S. Pat. No. 7,749,178, Petition for Inter Partes Review and Exhibits 1001-1011, Jun. 5, 2014, four hundred fourteen pages.
U.S. Patent and Trademark Office, Patent Trial and Appeal Board in re U.S. Pat. No. 7,749,178, Patent Owner LELO, Inc.'s Opposition to Petitioner's Motion to Join and/or Consolidate Proceedings Pursuant to 35 U.S.C.§ 315(C) and/or (D) and 37 C.F.R. § 42.122 and Exhibits 2001-2003, Jul. 7, 2014, twenty-eight pages.
"Evolved Novelties Bendable You Too, Purple, by Evolved Novelties" Amazon.com, Inc., 1996-2012, 4 pages, [Online] [Retrieved on Aug. 13, 2012], Retrieved from the Internet<URL:http://www.amazon.com/Evolved-Novelties-Bendable-You-Purple/dp/B004FV9WWC>.
"Natural Contours Ultime Vibrator, Periwinkle Blue, by Natural Contours" Amazon.com, Inc., 1996-2012, five pages, [Online] [Retrieved on Aug. 13, 2012], Retrieved from the Internet<URL:http://www.amazon.com/gp/product/B00005LBRK/182-1904675-0619406>.
"Snuggle Puss," Purr Inc., 2007, 1 page, [Online] [Retrieved on Jun. 11, 2009] Retrieved from the Internet<URL:http://www.mypurr.com/servlet/the-157/vibrators,-women,-pleasure,-vibration,/Detail>.
"Snugglepuss—G-spot Vibrator," Web Merchants, Inc., Last Updated Jan. 20, 2012, three pages, [Online] [Retrieved on Jan. 30, 2012] Retrieved from the Internet<URL:http://www.edenfantasys.com/vibrators/g-spot-vibrators/snugglepuss>.
Acrylic Xtc Pleasure Curve, Swedish Erotica, Discreet-Romance.com, 2 pages, [online] [retrieved Dec. 26, 2012], Retrieved from the internet <http://www.discreet-romance.com/acrylic-pleasure-curve-clear-adult-sex-toys-21708.html>.
Amazon.com, review for Natural Contours Ultime Vibrator dated Sep. 4, 2002, 1 page, [online] [retrieved Mar. 2, 2013], Retrieved from the internet <http://www.amazon.com/gp/pdp/profile/A3NPN2M6GABPE0/ref=cm_cr_pr_pdp>.
Berman Center Adonis GSpot/Clitoral Stimulator, Berman Center, Amazon.com, 2 pages, [online] [retrieved Dec. 26, 2012], Retrieved from the internet <http://www.amazon.com/Berman-Center-Adonis-Clitoral-Stimulator/dp/B000C90AY6>.
California Exotic Novelties, Acrylite Wand™ Clear, Acrylite Pleasure Curve™ and Toy Box™, Apr. 4, 2004, 1 page, [online] [retrieved from the internet May 17, 2012], Retrieved from the internet <web.archive.org/web/20040404062456/http:/calexotics.com/main.htm>.
California Exotic Novelties, Dual Rocker™, Aria's Discreet Pleasurizer™ and Dual Action Massager™, Apr. 4, 2004, 1 page, [online] [retrieved from the internet May 17, 2012], Retrieved from the internet <web.archive.org/web/20040404062456/http:/calexotics.com/main.htm>.
California Exotic Novelties, Impulse™, Waterproof Wireless Bunny™, and Elite 7X™—7 Function Sea Lion™, Apr. 4, 2004, 1 page, [online] [retrieved from the internet May 17, 2012], Retrieved from the internet <web.archive.org/web/20040404062456/http:/calexotics.com/main.htm>.
California Exotic Novelties, Reflective Gel™ 12" Veined Double Dong and Reflect Gel™ 10" Smooth Double Dong, Apr. 4, 2004, 1 page, [online] [retrieved from the internet May 17, 2012], Retrieved from the internet <web.archive.org/web/20040404062456/http:/calexotics.com/main.htm>.
California Exotic Novelties, Self Pleasurizer™, Impulse™, Stargazer™and Clit Kisser™, Apr. 4, 2004, 1 page, [online] [retrieved from the internet May 17, 2012], Retrieved from the internet <web.archive.org/web/20040404062456/http:/calexotics.com/main.htm>.
California Exotic Novelties, Silicone ULTRA™ Lighted Dolphin™ and Aria's Decadent Lovebird™, Apr. 4, 2004, 1 page, [online] [retrieved from the internet May 17, 2012], Retrieved from the internet <web.archive.org/web/20040404062456/http:/calexotics.com/main.htm>.
Doc Johnson Vivid G-Spot Tickler—Savanna, DocJohnson.com, 1 page, [online] [retrieved Dec. 26, 2012], Retrieved from the internet <http://www.docjohnson.com/vivid-g-spot-tickler-purple.html>.
Double Ended Self-Pleasurizer, Too Timid, Atlantic Innovations, LLC, 4 pages, [online] [retrieved Dec. 27, 2012], Retrieved from the internet <http://www.tootimid.com/double-ended-self-pleasurizer.htmlf>.
Double Pleaser Jelly, Adam and Eve Toys, Newhaba.com, 2 pages, [online] [retrieved Jan. 11, 2013], Retrieved from the internet <http://www.newhaba.com/adamandevetoys/7525.htm>.
Dr. Leonard's, "Ultime Massager," Oct. 27, 2003, two pages.
Dual Penetrator™ Vibrator, California Exotic Novelties, CalExotics.com, 2 pages, [online] [retrieved Dec. 26, 2012], Retrieved from the internet <http://www.calexotics.com/p-22479-dual-penetrator-vibrator.aspx>.
Dual Rocker, California Exotic Novelties, EdenFantasys.com, 2 pages, [online] [retrieved Dec. 26, 2012], Retrieved from the internet <http://www.edenfantasys.com/dual-rocker/adult-toys-dvds-15152>.
Dual Vibrating Flexi-Dong™, California Exotic Novelties, CalExotics.com, 2 pages, [online] [retrieved Dec. 26, 2012], Retrieved from the internet <http://www.calexotics.com/p-22326-dual-vibrating-flexi-dong.aspx>.
Elite 7X 7 Function Massager With Silicone Sleeve, Swedish Erotica, Spicetoy.com, 3 pages, [online] [retrieved Dec. 26, 2012], Retrieved from the internet <http://www.spicetoy.com/elite-7x-7-function-massager-with-silicone-sleeve.html>.
Elite 7X 7 Function Sea Lion, Swedish Erotica, Ourtoys.com, 1 page, [online] [retrieved Dec. 26, 2012], Retrieved from the internet <http://ourtoys.com/0575-12-3.htm>.
Feeldoe Slim, Product Photo, SIC 0008988, Dec. 20, 2004.
Femme Fatale G-Spot Teaser Pleaser, Nasstoys of New York, Nasstoys.com, 2 pages, [online] [retrieved Dec. 26, 2012], Retrieved from the internet <http://www.nasstoys.com/products/details.cfm?ProductID=2020-1>.
Fujiko's Asian Odyssey with Dual Pronged Stimulator, California Exotic Novelties, VitaSprings.com, 2 pages, [online] [retrieved Jan. 11, 2013], Retrieved from the internet <http://www.vitasprings.com/fujiko-asian-odyssey-california-exotic-novelties.html>.
Gemini Probe, Nasstoys of New York, Nasstoys.com, 1 page, [online] [retrieved Dec. 26, 2012], Retrieved from the internet <http://www.nasstoys.com/products/details.cfm?ProductID=1764>.
Google Books, The Many Joys of Sex Toy: The Ultimate How-to Handbook for Couples and Singles, Ann Semans, 1 page, [online] [retrieved May 10, 2013], Retrieved from the internet <http://books.google.com/books?id=nyUVuPs5GiUC&pg=PA53&dq=sex+toys+guide&source=gbs_toc_r&cad=4#v=snippet&q=ultime&f=false>.
Hitachi Magic Wand and Deluxe G Spot Attachment Combo, Hitachi, Amazon.com, 2 pages, [online] [retrieved Dec. 26, 2012], Retrieved from the internet <http://www.amazon.com/Hitachi-Magic-Deluxe-Attachment-Combo/dp/B000RY6SHS>.
Hot Entertainment, Inc., Hot Adult Toys a Researcher HET-298, Title 2, Chapter 6, Femipet, May 2, 2004, 2 pages.
International Search Report and Written Opinion of the International Searching Authority, Application No. PCT/US07/02259, Aug. 2007, 8 pages.
International Search Report and Written Opinion of the International Searching Authority, Application No. PCT/US2008/050641, Jun. 6, 2008, 12 pages.
Japanese Patent Office, Office Action, Japanese Patent Application No. 2012-223456, Nov. 4, 2014, 4 pages.
Land.aslia.net, Femipet, dated 2004, 28 pages, [online] [retrieved from the internet Mar. 23, 2013], Retrieved from the internet <http://land.aslia.net/h-tools/experience/experience2004.htm>.

(56) References Cited

OTHER PUBLICATIONS

LELO Aufliegevibrator—Sexspielzeug fr Frauen—Erotikforum, 2 pages, [online], [retrieved from the internet Sep. 22, 2014], Retrieved from the internet <http://www.lovetoytest.net/fourm/topic/5340-lelo-aufliegevibrator/>.

[Retrieval date unknown], Retrieved from the internet <http://www.lelo.com/staticPage.php?page=10years>.

Lily Aufliegevibrator—Luxus Vibratoren with Translation, 3 pages, [online], [retrieved from the internet Sep. 22, 2014], Retrieved from the internet <https://web.archive.org/web/20051024011054/http://shop.adultshop.de/produkt/2220183m.html>.

MoonBonBon, Femme Fatale G-Spot Teaser Pleaser Pink, 2 pages, [online] [retrieved from the internet May 17, 2012], Retrieved from the internet <http://www.moonbonbon.com/in-ja-femme-fatale-gspot-teaser-pleaserbubblegum-p-6017.html>.

MyLoveMachine.com, Adonis G Spot and Clitoral Stimulator, listing product release date of Aug. 22, 2005, 2 pages, [online] [retrieved from the internet May 17, 2012], Retrieved from the internet <http://www.mylovemachine.com/sex-toys/SE975014-adonis-g-spot-and-clitoral-stimulator.html>.

MyLoveMachine.com, Gemini Probe Pink, listing product release date of Jan. 1, 2000, 2 pages, [online] [retrieved from the internet May 17, 2012], Retrieved from the internet <http://www.mylovemachine.com/sex-toys/NW1764-Gemini-probe-pink.html>.

Natural Contours, From Women for Women, Jun. 1, 2002, 2 pages, [online] [retrieved May 9, 2013], Retrieved from the internet <http://webarchive.org/web/20020601144600/http://www.natural-countours.com/candida.html>.

Natural Contours, Jolie, Superbe, Petite, Ultime and Magnifique Brochure, 2 pages, 2002.

Natural Contours, Petite, Magnifique, Ultime and Superbe, May 16, 2001, 1 page, [online] [retrieved May 9, 2013], Retrieved from the internet <http://webarchive.org/web/20010516031310/http://www.natural-countours.com/>.

Natural Contours, Petite, Superbe and Magnifique Brochure, 1 page, 2001.

Natural Contours, Petite, Superbe and Magnifique Brochure, 1 page, 2002.

Natural Contours, Ultime, Apr. 8, 2002, 1 page, [online] [retrieved May 17, 2012], Retrieved from the internet <http://web.archive.org/web/20020408114635/http://www.natural-contours.com/ultime.html>.

Nine Parts Desire, Snuggle Puss Product Detail Page, Nine Parts Desire, 2006, 1 page, [Online] [Retrieved on Jan. 7, 2010] Retrieved from the Internet<URL:http://www.ninepartsdesire.com/index.php?main.sub.--page=product.sub.--in-fo&products.sub.--id=306 (last visited Jan. 7, 2010).

Office Action based on Canadian application No. 2,684,004 dated Dec. 15, 2010.

Onamagra Femipet, "A Sensual Vibrator Compatible with All Types of Women," Jan. 12, 2004, eight pages, [online] [retrieved from the internet Mar. 23, 2013], Retrieved from the internet <http://webarchive.org/web/20040112135317/http://daimaoh.kir.jp/ro/femipet.htm>.

Original Jack Rabbit Vibrator, TheRabbitVibrator.com, 3 pages, [online] [retrieved Dec. 26, 2012], Retrieved from the internet <http://www.therabbitvibrator.com/original-jack-rabbit-vibrator.aspx>.

Partial International Search Results, Application No. PCT/US2008/050641, Jun. 2008, 3 pages.

Reflective Gel Smooth Double Dong, California Exotic Novelties, AdultSensations.com, 2 pages, [online] [retrieved Dec. 26, 2012], Retrieved from the internet <http://www.adultsensations.com/california-exotic-reflective-smooth-double-dong-p-80.html>.

Reflective Gel™—AC/DC Double Dong 18", California Exotic Novelties, CalExotics.com, 2 pages, [online] [retrieved Dec. 26, 2012], Retrieved from the internet <http://www.calexotics.com/p-22143-reflective-gel-acdc-double-dong-18.aspx>.

Rock-Chick G-Spot Vibrator, Rocks-Chick.com, 1 page, [online] [retrieved Dec. 26, 2012], Retrieved from the internet <http://www.rock-chick.com/productlist.php?product=RCPKV>.

Rock-Chick, New Vibrating Rock-Chick, Nov. 25, 2004, 1 page, [online] [retrieved May 17, 2012], Retrieved from the internet <http://web.archive.org/web/20041125201922/http://www.rock-chick.com/>.

Sensual Universe, Dual Vibrating Flexi-Dong, listing product release date Mar. 26, 2003, 1 page, [online] [retrieved from the internet May 17, 2012], Retrieved from the internet <www.cduniverse.com/productinfo.asp?pid=6650398&style=atoy>.

SensualAdviser.com, Feeldoe Slim Blue, listing product release year 2005, 2 pages, [online] [retrieved from the internet May 17, 2012], Retrieved from the internet <http://www.sensualadviser.com/-/info__sex_toy/noveltyid=TAN9812.html/-FBFFEC58/2EF8-4D62-982B-D0947260FBCC?section=387&tab=1>.

Sexploration Sex Games and Adult Party Games, 3 pages, [online], [retrieved from the internet Oct. 22, 2014], Retrieved from the internet <http://web.archive.org/web/20051207042015/http://www.greatsexgames.com/productreviews.html>.

SexToy.com, Clitoral Dancer, Sep. 5, 2004, 1 page, [online] [retrieved from the internet May 9, 2013], Retrieved from the internet <http://web.archive.org/web/20040905173322/http://www.sextoy.com/clitoralstimulatingvibrators/SE0678-04.html>.

SexToy.com, Crystalessence Dual Penetrator Vibrator, including reviews from 2004-2012, 3 pages, [online] [retrieved from the internet May 17, 2012], Retrieved from the internet <http://www.sextoy.com/Crystalessence-Dual-Penetrator-Vibrator/sku.-SE0834-12>.

Silicone Ultra™ Lighted Dolphin™, California Exotic Novelties, www.SensualAdviser.com, 1 page, [online] [retrieved Dec. 26, 2012], Retrieved from the internet <http://www.sensualadviser.com/-/info_sex_toy/noveltyid=CE0570-14.html>.

Tantus Feeldoe Slim Vibrator, Tantusinc.com, 1 page, [online] [retrieved Dec. 26, 2012], Retrieved from the internet <http://tantusinc.com/catalog/Specialty-Items/Feeldoe-Slim>.

[Retrieval date unknown]; LELO Website pp. 2-4 retrieved from the internet <http://www.lelo.com/staticPage.php?page=10years>.

The Pincher Ribbed G-spot Dildo, Trinity Vibes, Amazon.com, 3 pages, [online] [retrieved Dec. 26, 2012], Retrieved from the internet <http://www.amazon.com/The-Pincher-Ribbed-G-spot-Dildo/dp/B0071B1PJ6>.

The Velvet Kiss Collection Little Dragon, Nasswalk of New York, Amazon.com, 3 pages, [online] [retrieved Dec. 26, 2012], Retrieved from the internet <http://www.amazon.com/Velvet-Collection-Little-Dragon-Lavender/dp/B004KI70I8>.

The World's Most Expensive Vibrator—PriveCo Inc, 1 page, [online], [retrieved from the internet Oct. 3, 2005], Retrieved from the internet <http://www.priveco.com/wormosexvibo.html>.

TheDiscountSexToys.com, Fujiko's Asian Odyssey, copyright 2003, 2 pages, [online] [retrieved May 1, 2012], Retrieved from the internet <http://www.thediscountsextoys.com/mall/more.asp?fm-more=551>.

Toy4pleasure, Tawney's Yellow G Spot Tickler™, copyright 2004, 3 pages, [online] [retrieved May 17, 2012], Retrieved from the internet <http://www.toy4pleasure.com/detail.aspx?fid=0&cid=0&pid=3460>.

Treasures for Pleasure, U Send Me, copyright 2005, 2 pages, [online] [retrieved from the internet May 17, 2012], Retrieved from the internet <http://www.treasuresforpleasure.com/Merchant2/merchant.mvc?Screen=PROD&Store_Code=TFP&Product_Code=GT626BL&Category_Code>.

U Send Me, Golden Triangle, FindAVibe.com, 2 pages, [online] [retrieved Dec. 26, 2012], Retrieved from the internet <http://www.findavibe.com/Anal-Sex-Toys/Anal-Vibrators/U-send-me.aspx>.

U.S. Patent and Trademark Office, Patent Trial and Appeal Board in re U.S. Pat. No. 7,749,178, Petitioner's Reply to Patent Owner's Opposition to Petitioner's Motion to Join and/or Consolidated Proceedings Pursuant to 35 U.S.C. § 315(C) and/or (D) and 37 C.F.R. § 42.122 and Exhibits 1012-1026, Jul. 18, 2014, 83 pages.

(56) References Cited

OTHER PUBLICATIONS

U.S. Patent and Trademark Office, Patent Trial and Appeal Board in re U.S. Pat. No. 7,749,178, Patent Owner LELO, Inc.'s Response to Petition for Inter Partes Review and Exhibits 2001-2021, Aug. 18, 2014, 467 pages.

U.S. Patent and Trademark Office, Patent Trial and Appeal Board in re U.S. Pat. No. 7,749,178, Patent Owner LELO, Inc.'s Preliminary Response to Petition for Inter Partes Review and Exhibits 2004-2008, Sep. 18, 2014, 94 pages.

U.S. Patent and Trademark Office, Patent Trial and Appeal Board in re U.S. Pat. No. 7,749,178, Petitioner's Reply to Patent Owners Response to Petition and Exhibits 1013-1029, Oct. 23, 2014, 181 pages.

U.S. Patent and Trademark Office, Patent Trial and Appeal Board in re U.S. Pat. No. 7,749,178, Decision Denying Petitioner's Motion for Joinder, and Denying Institution of Inter Partes Review Pursuant to 37 C.F.R. §§ 42.108, 42.122, Dec. 1, 2014, 12 pages.

U.S. Patent and Trademark Office, Patent Trial and Appeal Board in re U.S. Pat. No. 7,749,178, Patent Owner LELO, Inc.'s Motion to Exclude Evidence Under 37 C.F.R. § 42.62 and Exhibits 2030-2039, Dec. 3, 2014, 67 pages.

U.S. Patent and Trademark Office, Patent Trial and Appeal Board in re U.S. Pat. No. 7,749,178, Petitioner's Opposition to Patent Owner's Motion to Exclude, Dec. 12, 2014, 18 pages.

U.S. Patent and Trademark Office, Patent Trial and Appeal Board in re U.S. Pat. No. 7,749,178, Patent Owner LELO, Inc.'s Reply in Support of Motion to Exclude and Exhibit 2040, Dec. 19, 2014, 15 pages.

U.S. Patent and Trademark Office, Patent Trial and Appeal Board in re U.S. Pat. No. 7,749,178, Transcript of Oral Hearing of Inter Partes Review, Jan. 9, 2015, 81 pages.

Ultime™, Natural Contours®, 2 pages, [online] [retrieved Dec. 21, 2012], Retrieved from the internet <http://www.natural-countours.com/IBS/SimpleCat/Product/asp/product-id/36716941.html>.

United States Office Action, U.S. Appl. No. 11/344,987, Dec. 27, 2007, 10 pages.

United States Office Action, U.S. Appl. No. 11/344,987, Aug. 15, 2008, 11 pages.

United States Office Action, U.S. Appl. No. 11/344,987, Jun. 22, 2009, 23 pages.

Valhouli, Christina, "The Naked Truth," The International Design Magazine, 1 Page, Apr. 2001.

Water Missile Tear Drop Probe, California Exotic Novelties, QueensofPassion.com, 2 pages, [online] [retrieved Dec. 26, 2012], Retrieved from the internet <http://www.queens-of-passion.com/product/Water_Missile_Tear_Drop_Probe_-_Blue/0/SE0019122>.

Wikipedia, Hitachi Magic Wand, states product market date 1970s, 2 pages, [online] [retrieved from the internet May 17, 2012], Retrieved from the internet <http://en.wikipedia.org/wiki/Hitachi_Magic_Wand>.

Wikipedia, Rabbit Vibrator, states product market date 1990s, 2 pages, [online] [retrieved from the internet May 17, 2012], Retrieved from the internet <http://en.wikipedia.org/wiki/Rabbit_vibrator>.

www.Wayback.archive Freddy and Eddy, 2 pages, [online], [retrieved from the internet Oct. 9, 2014], Retrieved from the internet <http://www.freddyandeddy.com/productreviews/wis/lilyproductreviews.htm>.

* cited by examiner

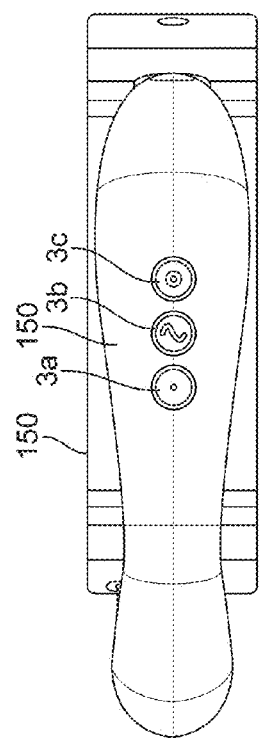
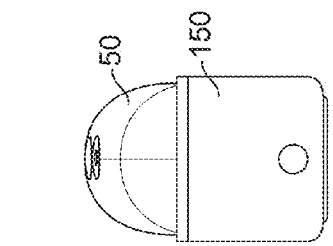
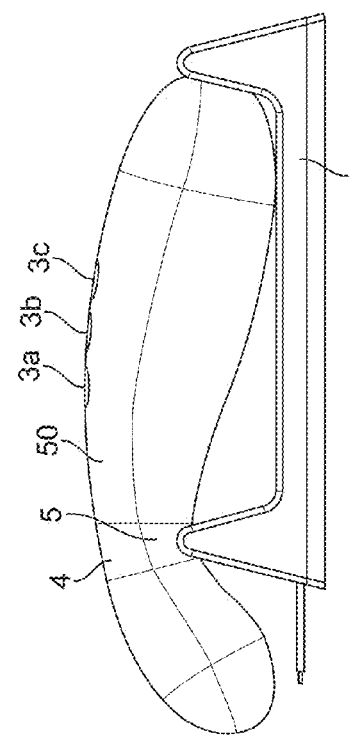
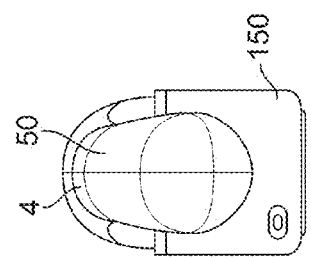

RECHARGEABLE PERSONAL MASSAGER

CROSS-REFERENCE TO RELATED APPLICATIONS

This application is a continuation-in-part of U.S. patent application Ser. No. 11/344,987, filed on Feb. 1, 2006, now U.S. Pat. No. 7,749,178, issued Jul. 6, 2010, which is incorporated by reference herein in its entirety. This application also claims the benefit of U.S. Provisional Patent Application No. 60/879,440, filed on Jan. 9, 2007, which is incorporated by reference herein in its entirety.

BACKGROUND

The present invention relates generally to massagers and more particularly to rechargeable personal massagers, methods, and apparatuses.

Personal vibrators, also known variously as vibrators, massagers, vibrating massagers and by numerous other names, are well-known in the art. They come in a variety of configurations and perform a variety of functions, ranging from medical therapy to erotic stimulation. They typically are battery-powered or run on conventional alternating current electricity.

Vibrating massagers powered by internally contained, disposable batteries operate for a period of time on the battery power, subsequently requiring some degree of disassembly, battery replacement, and reassembly. It will be apparent to the reader that this type of battery operation has drawbacks, including for example, limited time of operation, the inconvenience, expense, and environmental impact associated with the necessary battery replacement, and the difficulty of creating a reliable waterproof seal around a user operated moving part such as a battery door.

While some vibrating massagers operate on AC power, for example U.S. 110V or European 220V power, these massagers tend to be large and unsafe for internal use or use in damp environments. They also have the inconvenience of requiring proximity to a wall plug.

More recently known in the art are rechargeable massagers. These massagers are generally connected to the charger using a cord and male plug connectable to a female jack in the massager. The metal connectors and their receptacles often collect unsanitary residue, are difficult to clean and are subject to corrosion. Further, such jacks are difficult to waterproof reliably. An alternative implementation of a rechargeable device uses external metal contacts for charging (such as a cordless phone, etc). Such devices rely on gravity to provide the force necessary to make the electrical connection. Further, such devices require care from the user to ensure proper alignment and contact.

Many known personal massagers are made so as to be water proof or water resistant. It may be desirable to be able to use a vibrating massager in damp conditions; further, it is desirable to be able to use a vibrating massager fully submerged without fear of damaging the device or endangering the user. Some manufacturers waterproof their products (with varying degrees of success) with o-rings and similar seals around part breaks and user operated moving parts, such as battery doors, charging plug seals, etc. Often the resulting product is at best splash-proof, not submersible. It is desirable for users to be able to clean massagers thoroughly, particularly before and after they come in intimate contact with the body, which is made easier by providing a massager that is waterproof. To further ease of cleaning, some manufacturers use materials that are have a low porosity and, therefore, less likely to harbor bacteria or other contaminants.

Rechargeable massagers generally use a built-in female plug, engageable with a male plug for recharging, that is difficult to waterproof. If water gets into the female plug, and the powered male plug is then inserted, it's possible that the charger will be short circuited by as little as a single droplet of water. This can harm the charger or the massager, and can potentially be hazardous for the user as well.

Users often prefer massagers that are at or above body temperature, or can be warmed to this point. Many users warm massagers by holding them against less temperature-sensitive areas of the body, such as the hands, before using them on more sensitive areas. A few waterproof products on the market can be warmed by immersing them in hot water, but this can be inconvenient for the user.

Each user's particular physiology and preferences are unique, so the more options presented for the use of the product the better. Most products available are designed to be used in only a single orientation (e.g., one end is used for massage, the opposite end is gripped in the hand) and only a fixed end is designed for contact with the body.

As such drawbacks in the art are recognized such as to require improvements relating to safety, effectiveness, and/or waterproofing, personal massage devices and related features and devices are provided.

SUMMARY OF THE INVENTION

For example, a personal massage device includes a housing having an exterior surface defining first and second oppositely-disposed operative ends and an interior surface defining a cavity. Each of the operative ends can include a substantially smooth and continuous surface thereon. Each end can be, for example, distal of a member with each end being operative and designed for use or physical interaction and the use of either end can be provided by, for example, gripping the opposing end. In such embodiments, each end can be configured for operative use in physical interaction and configured for gripping for application of the opposing end. The massage device can further include one or more motors such as a first motor disposed within the housing and adapted for creating vibration and a battery disposed within the housing and adapted to power the first motor. In some embodiments, the operative ends extend toward a central portion of the device such that the central portion is disposed between the first and second operative ends. Preferably, the central portion includes a substantially smooth and continuous surface thereon. Further preferably, the substantially and continuous surfaces of the first and second operative ends and the central portion occupy at least 90% of the exterior surface of the device, and more preferably, about 100% of the exterior surface of the device.

In some preferred embodiments, the device further includes a second motor disposed within the housing and adapted for creating vibration. The first motor can be disposed near the first operative end, and the second motor can be disposed near the second operative end, The battery is further adapted to power the second motor.

The housing can be formed from an inner layer including the interior surface and an outer layer including the exterior surface. The inner layer and the outer layer are preferably made of different materials. For example, the inner layer can be made from hard plastic and the outer layer can be formed from an elastomeric material. Preferably, the outer layer includes a first section adapted to cover a first portion of the inner layer and a second section adapted to cover a second portion of the inner layer. In such embodiments, the first section includes the first surface of the first operative end, and the second section includes the second surface of the second operative end. The first and second sections can, for example, include mutually-engaging ends so as to form the exterior surface such that the exterior surface is substantially continuous. Alternatively, the outer layer can further include an annular third section adapted to cover facing ends of the first and second sections, respectively, so as to substantially seal the exterior surface of the device. In some embodiments, the device can further include an electromechanical button adapted for receiving a control input for the device, wherein the operative end of the button is integrally formed in the exterior surface.

A massage device can also be provided that includes a housing including an exterior surface and an interior surface defining a cavity, a first motor disposed within the housing and adapted for causing movement of the device, and a rechargeable battery disposed within the housing and adapted to power the first motor. The exterior surface is configured for physical application to a user and is seamless, whereby every surface is usable to provide an omnidirectional massage appliance. In various embodiments, the exterior surface can be substantially U-shaped, spherical, cubic, triangular, or other shapes.

In a preferred embodiment, at least 90% of the exterior surface is substantially smooth and continuous. In a further preferred embodiment, approximately 100% of the exterior surface is substantially smooth and continuous. The exterior surface includes a belt or one or more flush mounted articles such as a contact for a charger. The exterior surfaces preferably comprise an elastomer.

In a further preferred embodiment the battery is rechargeable and the device includes first and second contacts disposed on the exterior surface in electronic communication with the battery. Preferably, the external surface further defines a central portion disposed between the operative ends, and the contacts are disposed in the central portion. In an embodiment, the device is arched in a direction between the two operative ends so as to form an upper convex surface and a lower concave surface and so as to have an apex near the central portion, and the contacts are further disposed on the lower concave surface.

A personal massage assembly can be provided. The assembly can include a massage device such as one having first and second operative ends disposed on opposite ends of a central portion, a motor disposed within the device and adapted to provide vibrating motion for the device, a rechargeable battery disposed within the device and adapted to provide power for the motor, and a first pair of contacts disposed on an external surface of the central portion and in electronic communication with the battery. The assembly can further include a base adapted for supporting the massage device thereon and having a second pair of electrical contacts disposed on an external surface thereof and arranged, for example, to abut the second pair of contacts when the massage device is supported by the base. The abutting of the first and second pairs of contacts provides an electrical current to the battery to charge the battery. The base can in clued a lid that, when placed in position, applies pressure to the massage device and/or keeps the device stable. Padding in the lid can provide the pressure.

In an embodiment, the base includes an upper surface having a first depression and a second depression formed therein, wherein the first depression is shaped so as to mate with a portion of the first operative end, and wherein the second depression is shaped so as to mate with a portion of the second operative end. Preferably, the first and second operative ends have different shapes such that the base can support the device in only one orientation. The assembly can further include a lid adapted to attach to the base so as to hold the device in a supported relationship with the base.

A still further aspect of the invention relates to a rechargeable personal massager assembly. The assembly includes a hand-held massager with at least a first electrical contact connected to a rechargeable battery disposed therein, a base comprising a transformer connected to at least a second electrical contact, a respective magnet in each of the hand-held unit and the base for securing the first electrical contact to the second electrical contact when the hand-held massager is placed on the base. The assembly can further include an additional magnet in the hand-held massager and a magnetically-operated switch in the base. In such an embodiment, when the hand-held massager is placed on the base, the additional magnet operates the switch such that power is supplied to the charging contacts in the base only when the massager is in place on the base.

A still further aspect is the massager providing a self-contained massager entirely covered by a soft layer except for a relatively small portion for providing recharging contacts. The contacts may also be usable by being flush with the elastomer. The size of the contact area can be less than 1 cm$^2$ or more preferably less than 0.5 cm$^2$. Alternatively, the massager can be completely covered by the soft layer, having no exposed charging contacts. In such an embodiment, charging can be carried out using induction.

BRIEF DESCRIPTION OF THE DRAWINGS

These and other objects, features and advantages of the invention will be apparent from a consideration of the following non-limiting Detailed Description considered in conjunction with the drawing figures, in which:

FIGS. 5A, 5B, 5C and 5D are top, right side, front end and back end views of the massager of FIG. 1 situated in the base of FIG. 2, respectively;

DETAILED DESCRIPTION OF THE PREFERRED EMBODIMENTS

Figure 1:
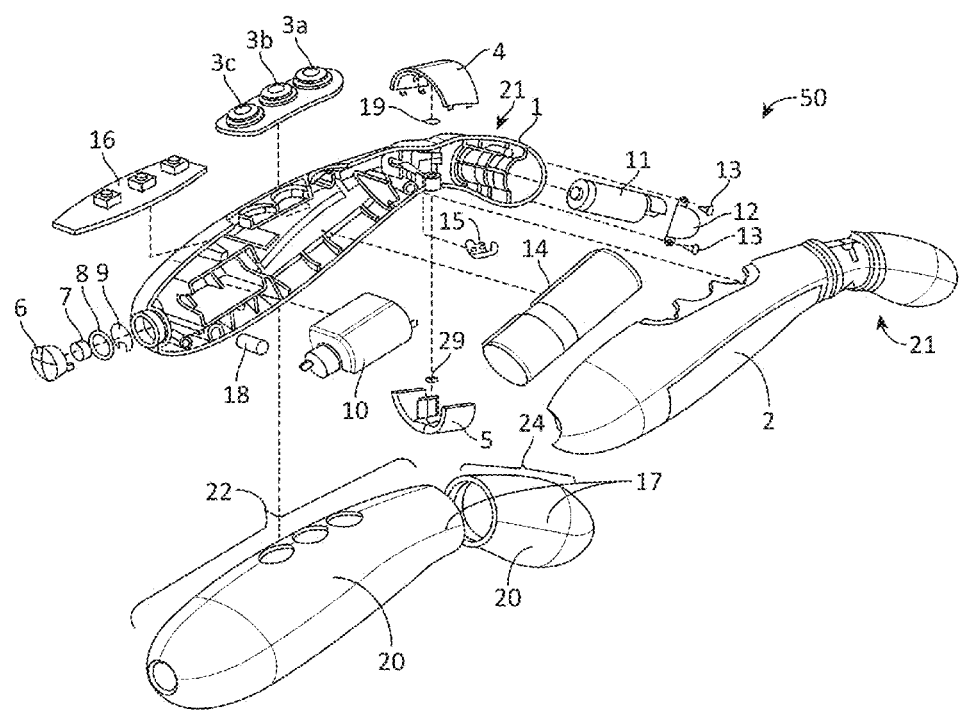
FIG. 1 is an exploded view of a massager in accordance with one embodiment of the present invention.

With reference now to the figures, there is provided herein illustrative embodiments of rechargeable battery-powered vibrating massagers (e.g., massager 50) and charging bases (e.g., charging base 150), which for example have an improved structure for physical interaction and other/or functional and structural advantages and features. The massager 50 can be charged via two metal contacts 6,15 which are each substantially flush with the external surface 20 of the massager. In one embodiment (as shown in FIGS. 9-12), the two charging contacts can be located in close proximity to one another, and protection from shorting is provided by physical interaction between features on the charging base and massager. In such an embodiment, the contacts can be positioned in close proximity to each other on almost any portion of the outside of the massager 50, including on either end 64,68 thereof or near the central portion 66. In another illustrated embodiment (shown in FIGS. 1-8), the two charging contacts 6,15 are apart from each other, and, for example, one of the two contacts on the massager 50 is attracted in particular to one of two contacts on the base 150 through a pair of embedded magnets 7,105.

Figure 3:
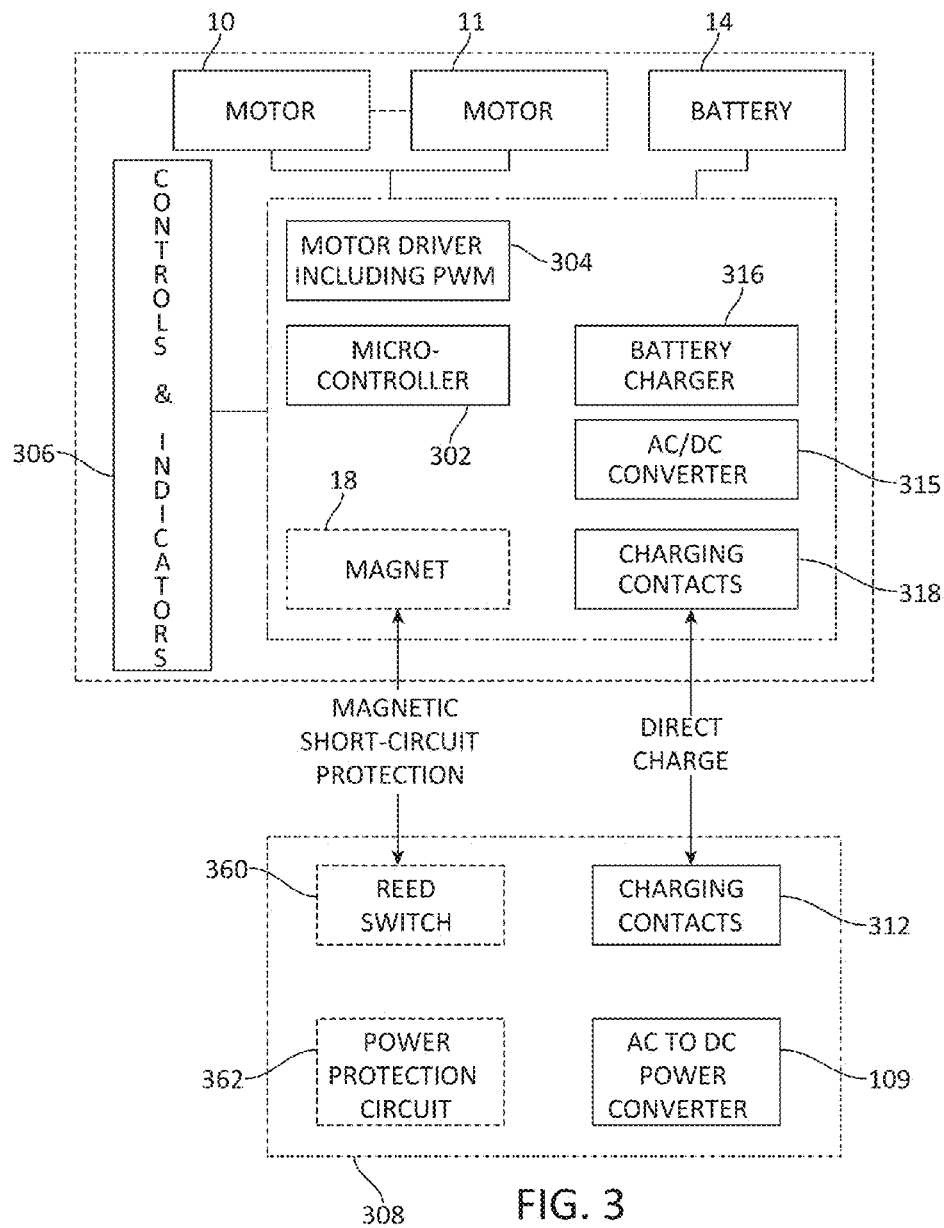
FIG. 3 is a block diagram illustrating the various electronic components of the massager of FIG. 1, with optional components indicated by a broken line.

With reference to FIGS. 1 and 3, massager 50 consists of a plastic housing 21, which can be hermetically sealed along the joint formed between the two halves 1,2 using, for example, ultrasonic welding. Two motors, one preferably large 10 and one preferably small 11 are included within housing 21. Each motor 10,11, as shown, can be fitted with an offset weight attached to its axle to generate vibration. The motors 10,11 are positioned at opposite ends of the housing 21 and preferably adjacent to or in a respective operative end, or lobe, 22,24 defined by the outside surface 20 of the massager 50. As shown, a rechargeable battery, which can be a lithium ion battery 14, is secured within housing 21 and is configured to provide power to motors 10,11. If desired, a single motor can be implemented.

Figure 4:
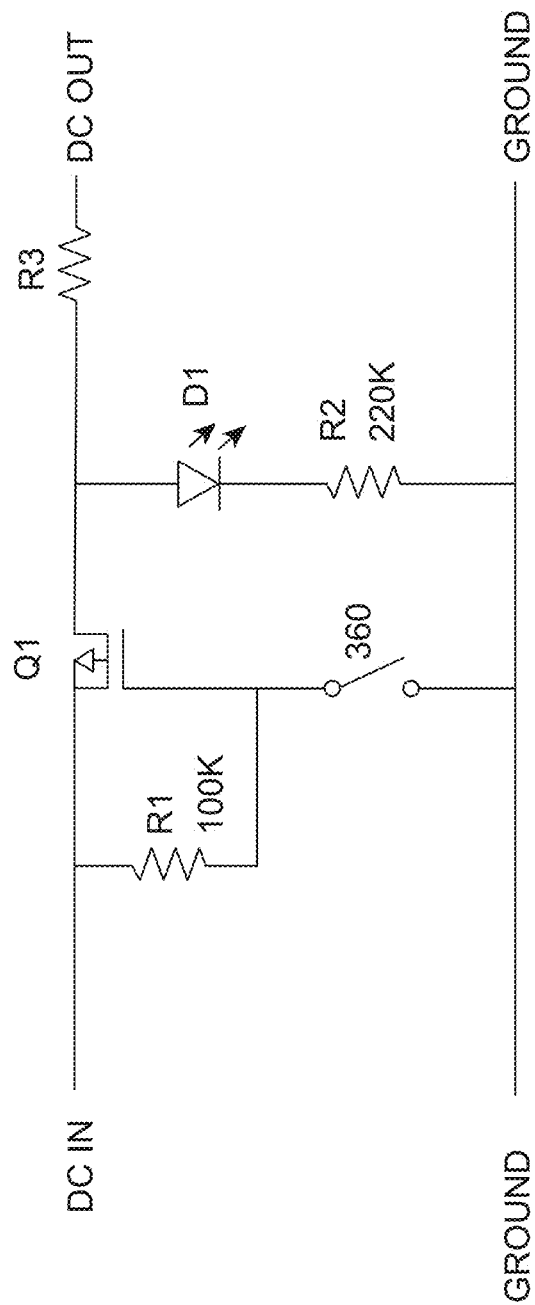
FIG. 4 is a schematic view of an electronic circuit used in the base of FIG. 2.

A printed circuit board 16 can be provided within housing 17 in order to carry electronic control components for massager 50. Such electronic control components preferably include a microprocessor or microcontroller (FIG. 3, 302) (e.g., an ASIC), which can control operation, indicators, or other device functionality or operation (e.g., power or charge management), a pulse width modulator (FIG. 3, 304) or other driver for one or motors (e.g., if a motor not requiring PWM is used), momentary switches or other types of switches for providing user control, LEDs (FIG. 3, 306; such as, as shown beneath the surface of the buttons 3 in FIG. 1), and additional supporting circuitry (FIG. 3) such as battery charger 316, charging contacts 318, and/or other supporting circuitry. It will be understood that FIG. 3 shows the electronic circuitry supported on printed circuit board 16 or otherwise within massager 50, wherein additional components for a reed-switch embodiment are illustrated using dashed boxes. Circuitry 308 for the charging base includes for example charging contacts 312, AC/DC converter 315 (e.g. external or external), a reed-switch 360 and related circuitry, such as a power protection circuit 362 (if implemented), and/or other supporting circuitry. FIG. 4 illustrates, as an example, reed-switch related circuitry for a reed-switch embodiment for selectively charging the battery. Other implementations are also contemplated. Operation of and arrangements and implementations for the circuitry will be understood by those of ordinary skill in the art. Specifically, for example in connection with the circuitry, it will be understood by those of ordinary skill in the art in the field of electronics. For example, in a non-reed switch embodiment involving two open contacts for charging, those of ordinary skill in the art will understand circuit design and arrangements for implementing a circuit to include such functionality in the present context. If desired, multiple internal batteries can be implemented. Further by way of example, embodiments can use other forms of charging arrangements such as using inductive charging or wireless power transmission.

In the embodiment of massager 50 shown in FIGS. 1-8, electrical contact 6, the associated magnet 7, and O-ring seal 8, together function as part of a first external electrical charging contact assembly. The metal collar of band 4,5 along with seals 19,29 together function as part of a second external electrical charging contact assembly.

Magnet 18 interacts with and operates a reed switch in the base 150 described below with reference to FIGS. 2-4, so as to activate the charging function of base 150. The result of the interaction between magnet 18 and the reed switch is such that charging is only permitted when the massager 50 is in the base 150. Note if desired, the embodiment of FIG. 1 can be implemented without a reed-switch and related circuitry or components (e.g. without a magnet) using, for example, the same contact arrangement.

In the embodiment illustrated in FIGS. 1-8, a soft outer layer 20, comprised of a biocompatible material such as silicone or TPE, substantially covers housing 30. Outer layer 20 can be overmolded onto the outside of the housing 21 after assembly of the housing with its internal components. The soft material covers the part breaks in the underlying plastic housing 21 to form substantially continuous portions on the exterior surface 17 of massager 50, reinforcing the waterproof seal of the ultrasonic weld and making the product more hygienic, easier to clean and more comfortable for contact with and use on the skin. If desired, other configurations can be implemented such as to use a housing made of other materials or one which is not waterproof.

Also in the illustrated embodiment, the metal band components 4,5 are assembled around a circumference of the housing 21. The metal band provides an attractive surface for branding or personalization of the massager. It can also function as a contact for charging the battery 14. A second metal part 6 at the tip of one end of the housing 21 serves as the second charging contact. Metal band 4,5 and secondary metal contact 6 also serve a function in the manufacturing process. To achieve a seamless overmolded skin for the outer layer 20 of massager 50, which covers the housing 21, it may be preferable to securely hold onto the underlying substrate material such that the substrate will not shift in the mold under the extreme pressures of the overmolding process. To achieve such a secure hold, a hard, moldable material with the appropriate properties can be provided. These external metal parts of massager are designed and positioned such that they can cover and provide a seal for the anchor points used during the overmolding process.

Numerous alternative configurations are possible; for example, the massager can incorporate one or a plurality of different sources of vibration, such as rotational, solenoidal, piezoelectric, among others. Different methods can be used for the assembly or construction the massager. As discussed below with reference to FIGS. 9-12, the two halves 1,2 of the inner housing 21 can be attached together using screws, glue, or a combination of both as an alternative to ultrasonic welding. Additionally, the outer layer 20 can be formed as a separate part or a plurality of separate parts, for example two or three, as discussed below, and assembled to the massager after assembly of the internal components into the inner housing 21 and assembly of the two halves 1,2. In such an embodiment, the parts of the outer layer 20 can be slid over the massager subassembly and secured in place with glue or using the metal band components 4,5. Alternatively, massager 50 can be constructed without an outer layer. Further, other configurations or shapes for outer layer 20 can be provided, while maintaining the same underlying rigid form, to provide different aesthetic and functional variations of the massager. Additionally, alternative shapes can be formed in both housing 21 and outer layer 20.

Further variations of the massager are possible including the construction of the massager without cosmetic details, such as the metal band 4,5. Additionally, the contacts can be located in various places on the massager, and can be used for various cosmetic effects. Other overmolding anchor points can be used. Similarly, anchor points can be concealed by means other than the metal contact parts, or other processes which do not require anchor points, such as casting, can be used instead of overmolding.

Further, other embodiments of a massager are possible in which the motors provide a motion other than vibration. Such motions can include bending, twisting, rotating, contracting, expanding, etc. In such an embodiment, it can be preferable to form housing 21 from a pliable material or to include joints, such as hinges or the like, to facilitate such movement.

In one embodiment, there are three buttons 3a,3b,3c on the massager 50 which provide control of the massage functions. Two of the buttons 3a,3c each control the speed of a respective motor. Button 3a controls motor 1, and button 3b controls motor 10. Button 3b changes the vibration mode or pattern. One exemplary implementation of the button functions is described herein below. It is understood that this is only one of many different possible operational implementations that can involve the use of these, fewer, or additional buttons. If desired, the massager can be configured to communicate to the user by using preprogrammed vibrations such as to briefly vibrate when the massager is turned on.

With respect to the functions of button 3a in an exemplary embodiment, pressing button 3a when motor 11 is off will turn motor 11 on at low speed. Pressing button 3a again will speed up motor 11 to low-medium speed. Pressing button 3a again will speed up motor 11 to medium speed. Pressing button 3a again will speed up motor 11 to medium-high speed. Pressing button 3a again will speed up motor 11 to high speed, and, finally, pressing button 3a a sixth time will return motor 11 to the off state. It is understood that variations of this function are possible, including those with more or fewer speed increments.

With respect to the functions of button 3c, pressing button 3c when motor 10 is off will turn motor 10 on at low speed. Pressing Button 3c again will speed up motor 10 to low-medium speed. Pressing button 3c again will speed up motor 10 to a medium speed. Pressing button 3c again will speed up motor 10 to a medium-high speed. Pressing button 3c again will speed up motor 10 to a high speed, and, finally, pressing button 3c a sixth time will return motor 10 to the off state.

With respect to the functions of button 3b, pressing Button 3b will cause it to change to the next in a cycle of 6 vibration patterns incorporating both motor 11 and motor 10. An example of such vibration patterns are described in International Patent Application Pub. No. WO2007089638, which is incorporated by reference herein in its entirety. For instance, one mode can be such that each motor operates on a slow sine curve. The sine curves for both motors can have the same frequency, but can be 180 degrees out of phase from each other. Another mode can have one motor on a fast sine curve (twice the frequency of the slow one, for example) and the other motor on a slow sine curve. Working with wave forms that are harmonics of one another can improve the interactions of the two motors. Additionally, the power levels (the amplitudes of the wave forms) of the two motors can be adjusted to encourage interference, as is possible within the variation in motor speed control that is inherent in most motors. As described above, the individual speed control functions of buttons 3a and 3c allows for independent control of vibration motors 10,11. This allows for a user to customize the interference pattern between the motors in addition to the predetermined patterns that are selectable with button 3b. This can increase the likelihood that a user will be able to get the massager into a setting where there is desirable interference between the motors.

Buttons 3a,3b,3c can also be used to implement a control-lock functionality. For example, pressing and holding any button 3a,3b,3c for 2 seconds can turn off both motors 10,11 and can put the massager 50 in an "off" state. Such action can further "lock" the controls such that, when the massager 50 is off, pressing any button 3a,3b,3c momentarily will not cause the motors to start, or the vibration pattern to change. Pressing and holding any button 3a,3b,3c for 2 seconds when it the massager 50 is off and the controls are "locked", however, can turn massager 50 on again and cause it to resume function at whatever settings we being used when massager 50 was turned off. Additionally, the electronic circuitry can be used to automatically implement a "statndby" mode for massager 50 and to automatically turn massager off after predetermined periods of no use. For example, the circuitry can be configured to implement the standby mode after the device is on, but when both motors have been placed in the off state, for example by cycling through the various stages thereof using buttons 3a and 3c. After, for example, 5 minutes in the statndby mode, the circuitry automatically turn massager into the off state, such that momentary pressing of a button 3a,3b,3c will cause no action, and only pressing or holding one of the buttons for more than 2 seconds, for example, will turn the massager on.

Figure 2:
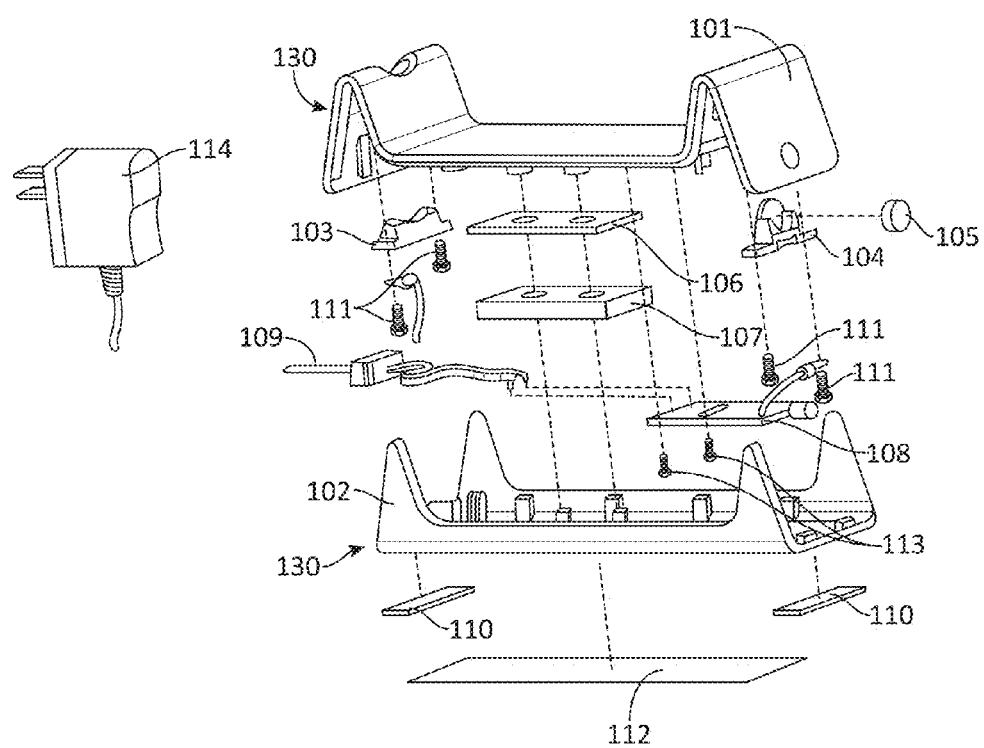
FIG. 2 is an exploded view of a base for supporting and charging the massager of FIG. 1 in accordance with one embodiment of the present invention.

One embodiment of a base 150 that can be used to charge massager 50 is shown in FIGS. 2 and 4. The base 150 consists of a plastic housing 130 comprising two housing portions 101,102. Housing 130 encloses charging circuitry 103-111 that includes two metal charging contacts 103,104. The circuitry can receive an electronic current from an external transformer 114 for converting external AC power into DC power of the appropriate characteristics. In a preferred embodiment, the circuitry is potted in place with epoxy to waterproof base 150. The housing 130 is preferably made from a hard plastic material, but can be made of other functional or aesthetic materials such as fabric, ceramic, glass, metal, wood, and others. Additionally, the base can incorporate other functions such as cable management, a storage box, a lockable enclosure, etc.

Figure 6:
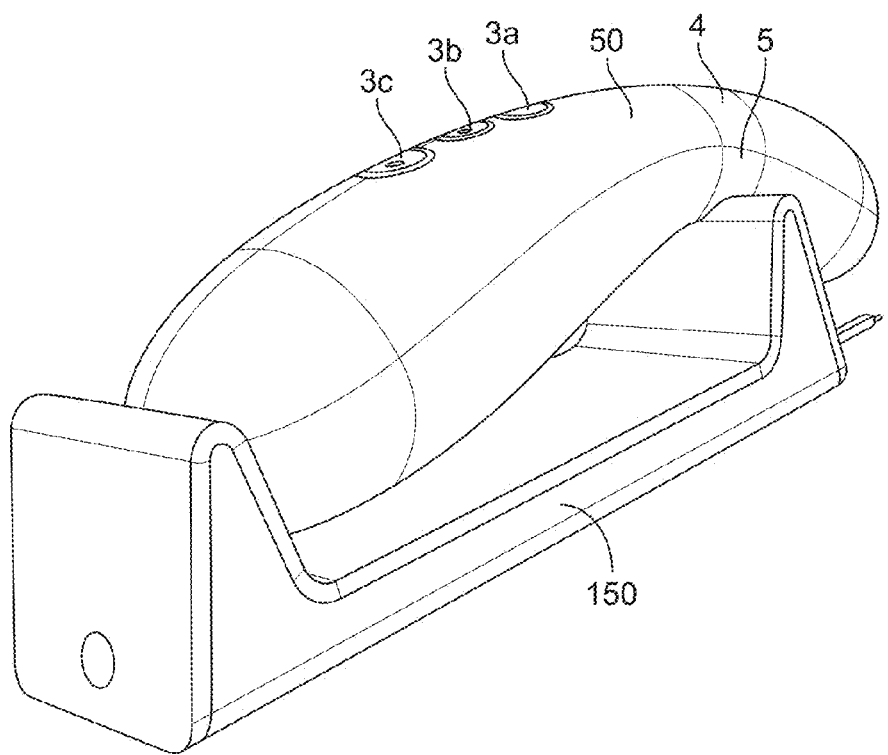
FIG. 6 is a perspective view of the massager of FIG. 1 situated in the base of FIG. 2.
Figure 7A:
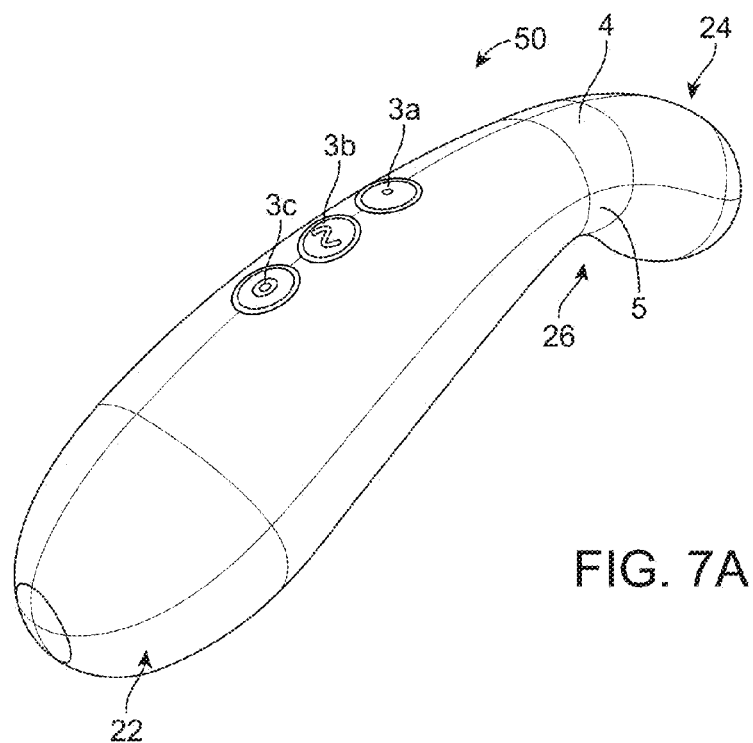
FIGS. 7A and 7B are front and rear side perspective views of the massager of FIG. 1, including the electrical contacts for mating with electrical contacts on the base.
Figure 7B:
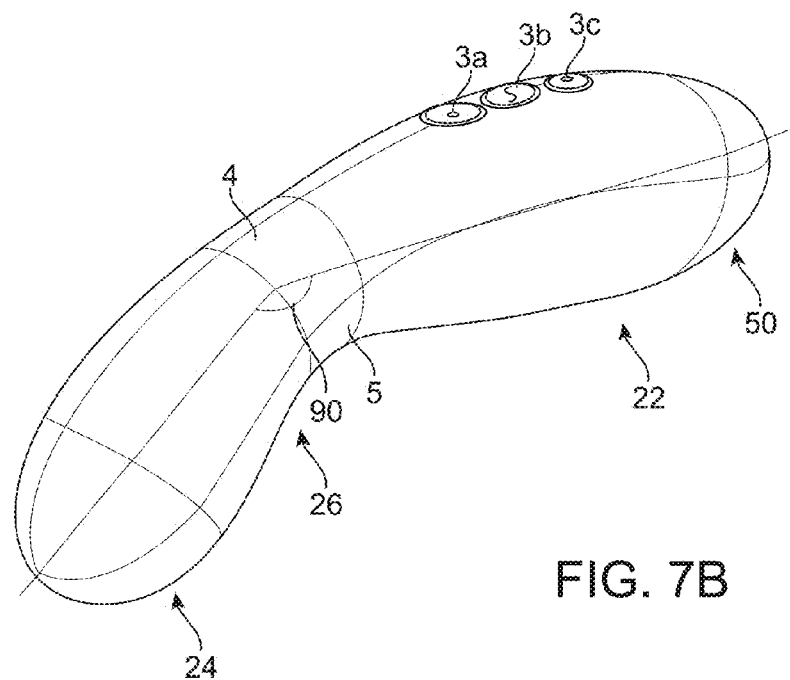
Figure 8:
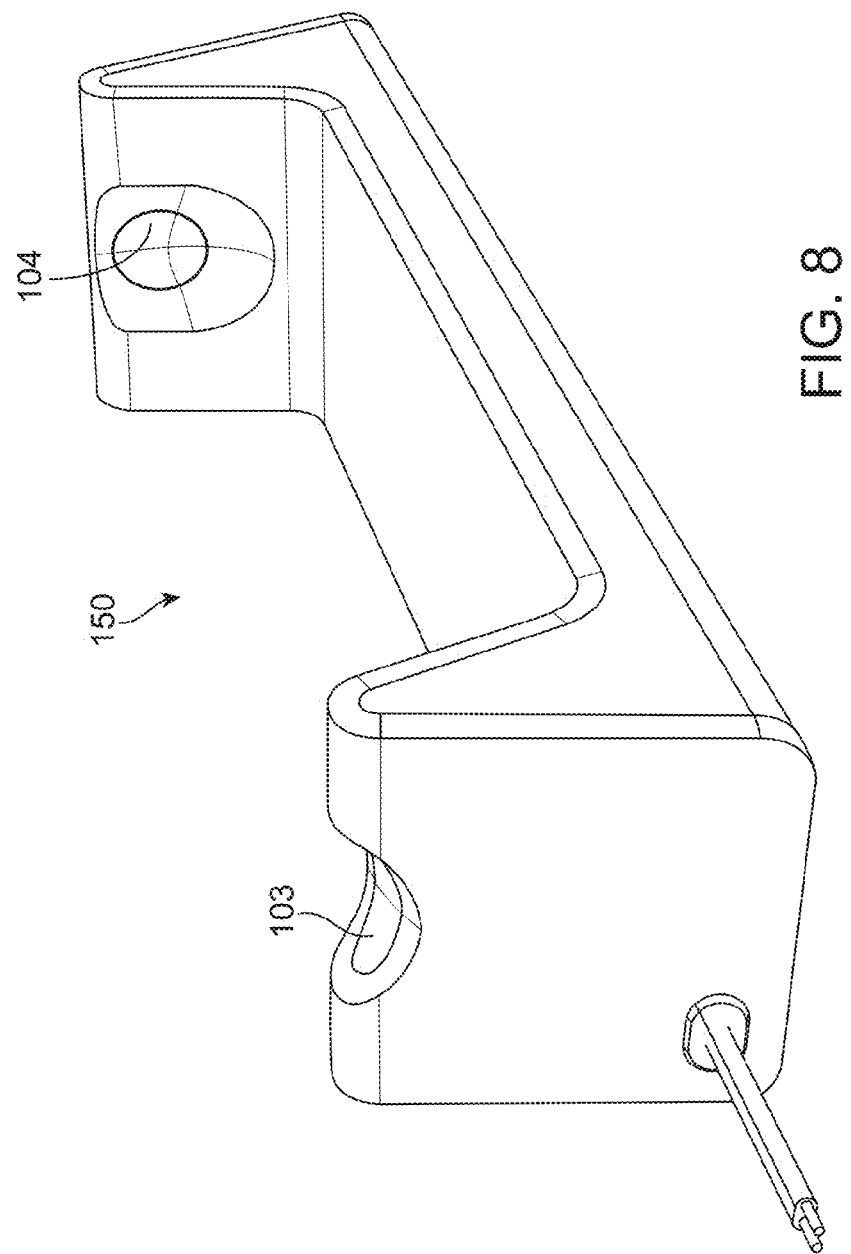
FIG. 8 is a perspective view of the massager base of FIG. 2, including the electrical contacts for mating with the electrical contacts on the massager.

The base 150 has surfaces that support the massager 50 and guide it into a specific orientation which assists in establishing proper electrical contact between the two units. See FIGS. 5, 6, 7 and 8 for various views of the assembled massager (FIG. 7), base (FIG. 8) and the massager and base engaged in a supporting, charging relationship (FIGS. 5 and 6). A wide variety of alternative relative orientations between the base and the massager can be imagined. In the embodiment of FIGS. 1-8, massager 50 includes a magnet 7 and base 150 includes a magnet 107 arranged within the respective units to attract one another. The mutual attraction between the magnets assists the user in placing the massager into the charging base in the correct orientation, completing the connection with positive feedback to the user, and assists in holding the massager in good contact. When the massager 50 is placed on the base 150 in the proper position (FIGS. 5 and 6), multiple charging elements interact to initiate the charging function. The contact portion 5 of the massager 50 engages, in a cradled relationship, collar contact 103 in the base 150. Similarly, massager contact 6 engages charger contact 104. An additional magnet pair can be included in the collar area of massager 50 and in the collar-contact area of base 150 to further the attachment and to further guide the massager 50 into the proper orientation on the base 150. In a preferred embodiment, the magnets in the base 150 have a different polarity between each other, as to the magnets in the massager 50, thus preventing the massager 50 from being placed on the base 150 in the wrong orientation.

In "reed switch" embodiments, the magnet 18 in the massager 50 magnetically activates the reed switch included on printed circuit board 108 within the base 150, whereby to apply charging power to electrical contacts 6 and 5 on the massager 50. More particularly, when the massager 50 is placed on the base in the correct orientation, the magnet 18 in the massager 50 comes in close proximity with the reed switch 160 on PCB 108 in the charging base 150 and causes it to close, thereby completing the charging circuit and permitting the charging base 150 to apply the appropriate voltage to the massager 50 via the collar metal contact 103 and the end plug metal contact 104 on the charging base 150, to charge the battery as described. It will be understood that any proximity sensing switch may be used for reed switch 160, including other types of signals such as magnetic, radio frequency, electronic, or the like.

LEDs can be included on the massager and can illuminate to indicate that the contacts in the massager and charging base have been successfully connected, and that charging is underway. Alternative or additional means of indicating the coupling or charging status can be implemented, including audio feedback such as beeping, tactile feedback such as vibration, or other forms of visual feedback than LEDs.

The charging of the massager battery 14 by the base 150 is controlled by circuitry (FIG. 3: 308 and FIG. 4) that optimizes charging time and battery life. The charging functionality in the preferred embodiment is optimized for the use of a single lithium-ion type battery 14. It will be understood that other types of rechargeable batteries, such as nickel metal hydride (NiMH), could be used in the massager, and the charging functionality could be optimized for these types of batteries.

The massager can for example react intelligently to its charging status, automatically performing certain functions upon the initiation and cessation of charging. For example, the circuitry (FIG. 3) in the massager 50 can indicate its battery level (e.g. high charge, medium charge, low charge, or fully discharged) by flashing the LEDs in specific patterns. The circuitry (FIG. 3) in the massager 50 controls the massager 50 can for example cease motor operation before the batteries are fully drained so that it can maintain other basic functions, such as radio frequency communication or indication of status via the illumination of LEDs. Further, for example, the circuitry (FIGS. 3 and 4) in the massager and base operate together so the massager 50 cannot be turned on when in the charger 150. If the massager 50 is vibrating when it is placed on the base 150, the circuitry (FIGS. 3 and 4) in the massager 50 and base 150 operate together so the massager is automatically shut off. Numerous means of communicating status to the user, means of reacting to a low battery status, fully charged status, successful or unsuccessful charging connection status, etc. have been described. Many alternative means of communicating or reacting to these functional states are apparent.

Additionally, the operation of the massager 50 and the base 150 can cause warming of the massager 50. These operations can include charging of the massager 50 on the base 50 or operation of the motors 10,11. These processes are exothermic, which leads to the production of heat that is absorbed by housing 21 and outer layer 20 of massager 50. The components that produce heat can be placed near surfaces that are desired to benefit from such warming.

Alternative embodiments of a massager and a base are shown in FIGS. 9-12. Many aspects of both the external and internal components and functions are similar to the embodiment of FIGS. 1-8 with the differences described herein. As shown in FIG. 9, massager 250 includes two contacts 205a, 205b at the collar, rather than one at the collar (FIG. 1, 5) and one (FIG. 1, 6) at the end of the massager (FIG. 1, 50). This eliminates the interruption at the end of the second portion 22 of the exterior surface 20 of the embodiment of FIGS. 1-9 due to the charging contact 6. Because the end of operative end 222 (and 22 in FIG. 1) is a key functional area, elimination of a charging contact in this area improves the hygiene of the product. It also improves the tactile qualities of that end of the massager 250. It further removes a discontinuity on the surface of the portion of outer layer 220 that covers operative end 222 of massager 250. This large, useable surface of outer layer 220 compliments the continuous surface found on operative end 224 of massager 250 to increase the overall useability of the massager 250 in the sense that multiple surfaces can be comfortably and safely used on the body.

In an exemplary embodiment, massager 250 is between about 150 cm and 200 cm in length and more preferably about 174 cm, although other lengths are possible. Additionally, in the exemplary embodiment, operative end 222 can have a width at its widest point between about 3 cm and 5 cm, and more preferably about 4 cm. Similarly operative end 224 can have a width at its widest point between about 2 cm and 4 cm and, more preferably, about 3 cm. Further, central portion 226 can, by way of example have a width at its narrowest point of between 2 cm and 3 cm, and more preferably about 2.2 cm. Other dimensions for massager 250 are possible. For example, the entire massager can be scaled within the given, exemplary ranges to form a larger or smaller massager. Further, alternative shape configurations are possible, including such that both operative ends are the same shape, such that the large end is narrower than the small end, such that the central portion is wider than the ends, or such that the device has a constant width. Further, many aspects of the embodiments described can be used in a massager that is substantially U-shaped, spherical, cubic, triangular, or the like.

In the exemplary configuration described above, operative end 222 has a continuous surface of at least 100 cm², preferably between about 120 cm² and 150 cm², and more preferably about 130 cm². Similarly, operative end 224 preferably has a continuous surface having an area of at least 10 cm², preferably between about 20 cm² and 30 cm² and, more preferably of about 22 cm². Other size ranges for continuous portions of the outside surface of variations of a massager having different shapes are possible. In a preferred embodiment, every surface of the massager can be a usable surface by having a soft layer such as an elastomer cover the surface except for a relatively small portion configured for the contacts that is preferably about 15 cm² or less, and more preferably about 10 cm² or less. The contact area can also be a usable surface by for example having flush mounted contacts. The respective sizes of the continuous surfaces can be scaled with the size of the massager, as discussed above or can otherwise vary in accordance with other possible configurations for the massager. In an embodiment, the entire outside surface of the massager is continuous. Dimensions and specifications provided herein are provided for illustrative purposes.

Figure 9A:
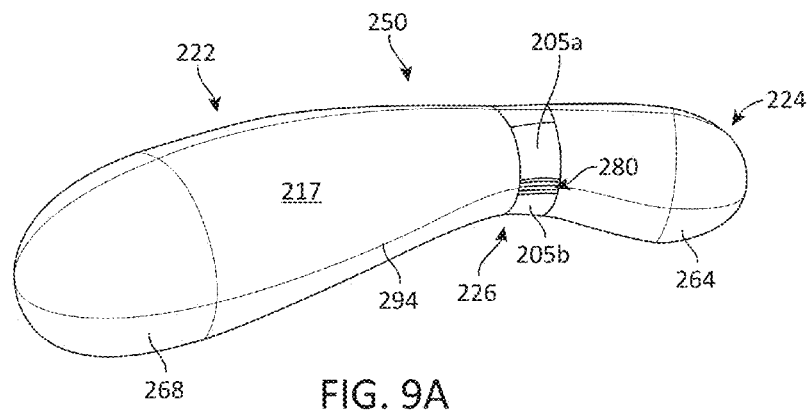
FIGS. 9A and 9B are perspective views of a massager according to another embodiment.
Figure 9B:
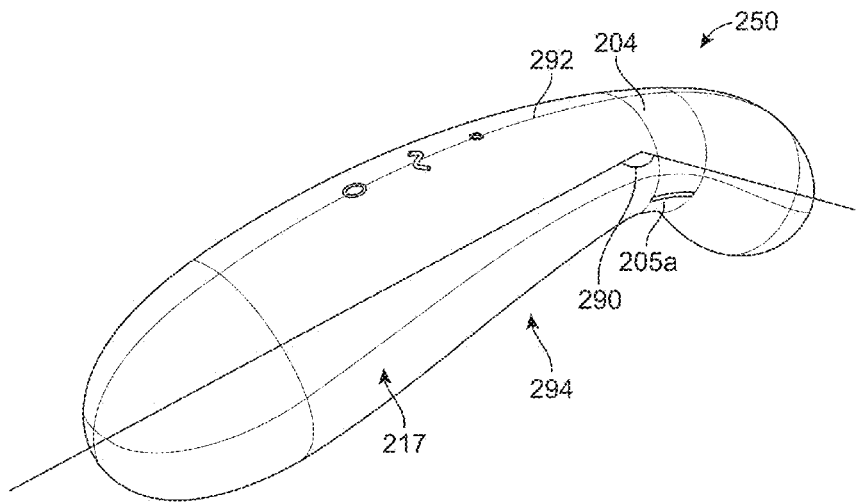

The contoured outer surface 217 of massager 250, as shown in the exemplary embodiment of FIGS. 9A and 9B, can include the formation of an arch-like shape between the outermost ends of the massager 250. This can result in the massager having an upper surface 292 having a convex shape and a lower surface 294 having a concave shape, wherein both shapes are defined along a vertical plane that bisects the massager 250 through both ends thereof. Both surfaces, among others present, can be used on the body to impart various sensations or the like. Further, such an arch-like shape can define an angle 290 between operative end 222 and operative end 224. As shown in FIG. 9B, the angle 290 can be further defined by an intersecting pair of lines, one of which is formed between the center of the endpoint of operative end 222 and the center of central portion 226, and the other of which if formed between the endpoint of operative end 224 and the center of central portion 226. Other methods of measurement are possible, including along the upper surface 292 or the lower surface 294. Angle 290 is preferably between 90° and 180°, and is more preferably at least 120°. In an embodiment, angle is less than 160°, and more preferably about 135°, although other angles are possible.

The massager 250 includes an outer layer 220 that is not overmolded. Instead, three sheaths 264,266,268 made from elastomeric material such as silicone, TPE or the like are molded separately, then assembled over the plastic substrate of housing 30. Sheath 264 fits over operative end 224 of massager 250, and sheath 268 fits over operative end 222. The sheath 266 is an annular band which covers the collar area 226, and overlaps both of the two other sheaths 264,268, thereby helping to seal the unit. In an alternative embodiment, sheaths 264,268 can be arranged to overlap or abut each other in the collar area 226 and sheath 266 can be eliminated. In either embodiment, the sheaths 264,266,268 can be glued or otherwise affixed together or can be left unattached, the tension and interaction between the components providing an adequate seal for the massager 250. In yet another embodiment, a single sheath can enclose the entire form. As shown in FIG. 9, sheath 266 can include a pair of holes 270a,270b to allow access between the interior of the housing 221 and the contacts 205a,205b. The pressure of contacts 205a,205b against sheath 266 can be sufficient to maintain the water-resistant properties of massager 250. Alternatively, the contacts can be insert-molded into the hard plastic housing 221.

Preferably, massager 250 is water resistant with an ISO rating of at least IPx 6, and more preferably, massager 250 is rated as fully submersible in water to a distance of at least about 1 m, for instance as specified in IPx6.

The illustrated construction of the outer layer 220 allows for incorporation of the button 203a,203b,203c functionality into the outer layer 220 (shown as part of sheath 268). This eliminates three part breaks in the surface of the unit, which further increases the useable area for operative end 222 and increases the water-resistance of the unit and the overall hygiene of the unit.

Figure 10:
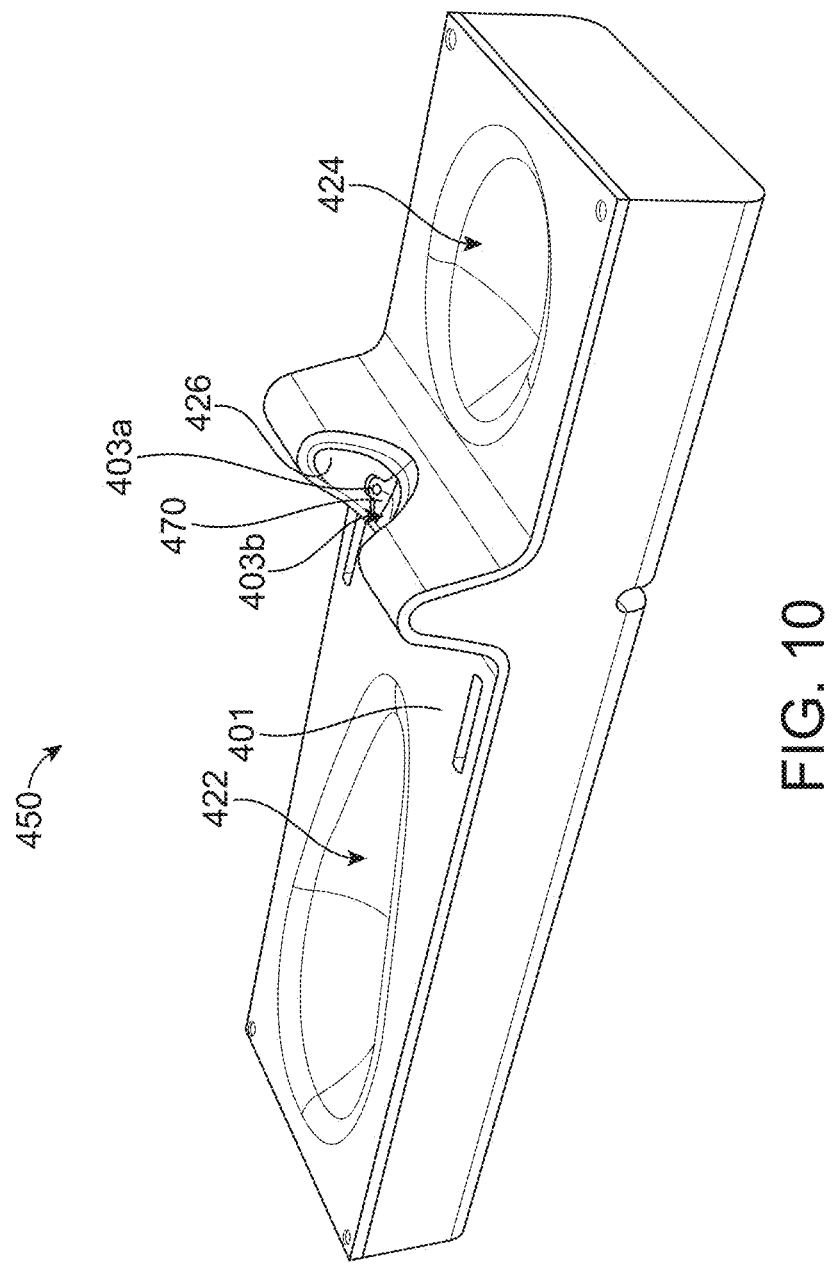
FIG. 10 is a perspective view of a base for supporting and charging the massager of FIG. 9 in accordance with another embodiment.
Figure 11:
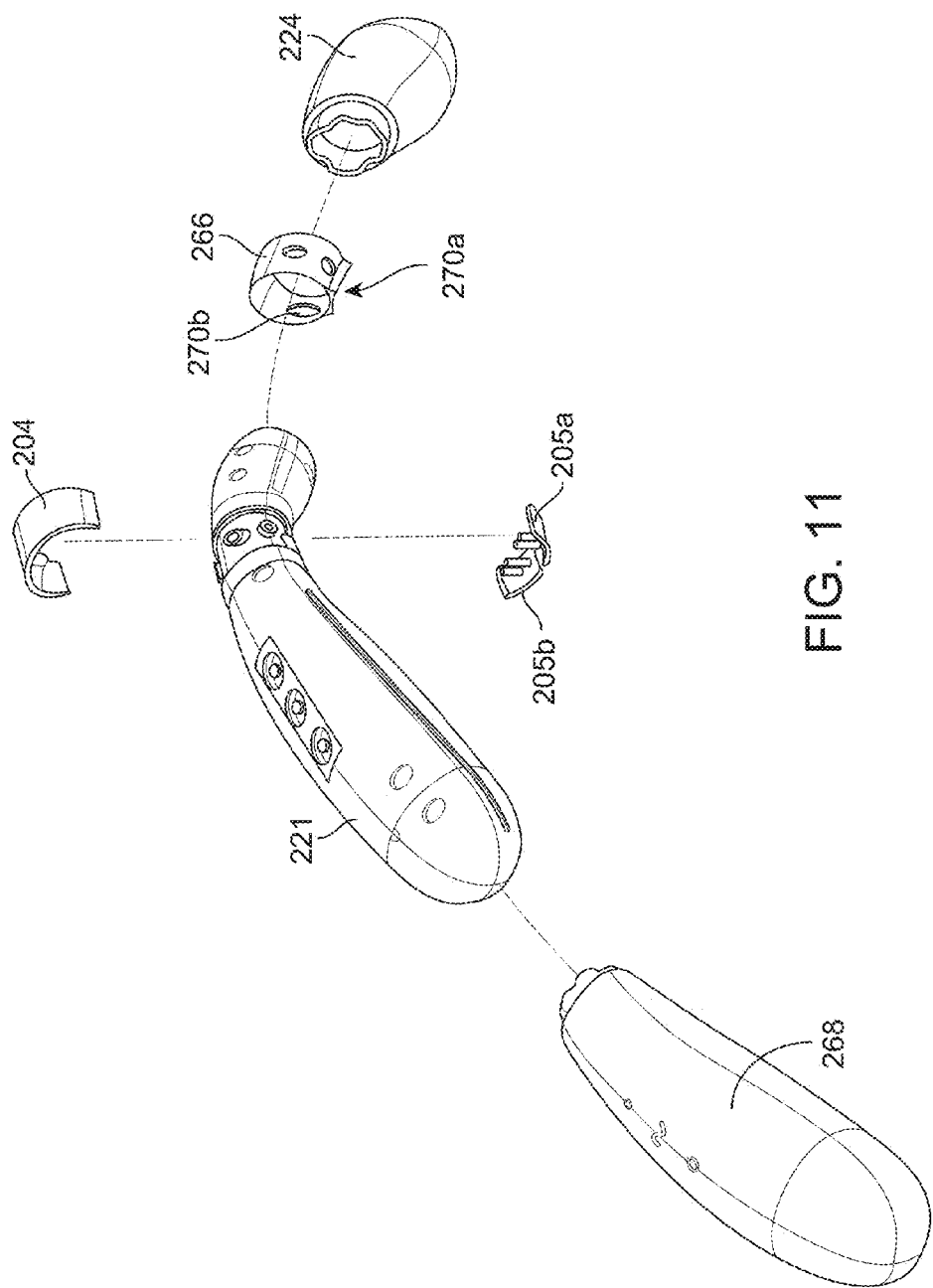
FIG. 11 is an exploded view of the massager of FIG. 9.
Figure 12:
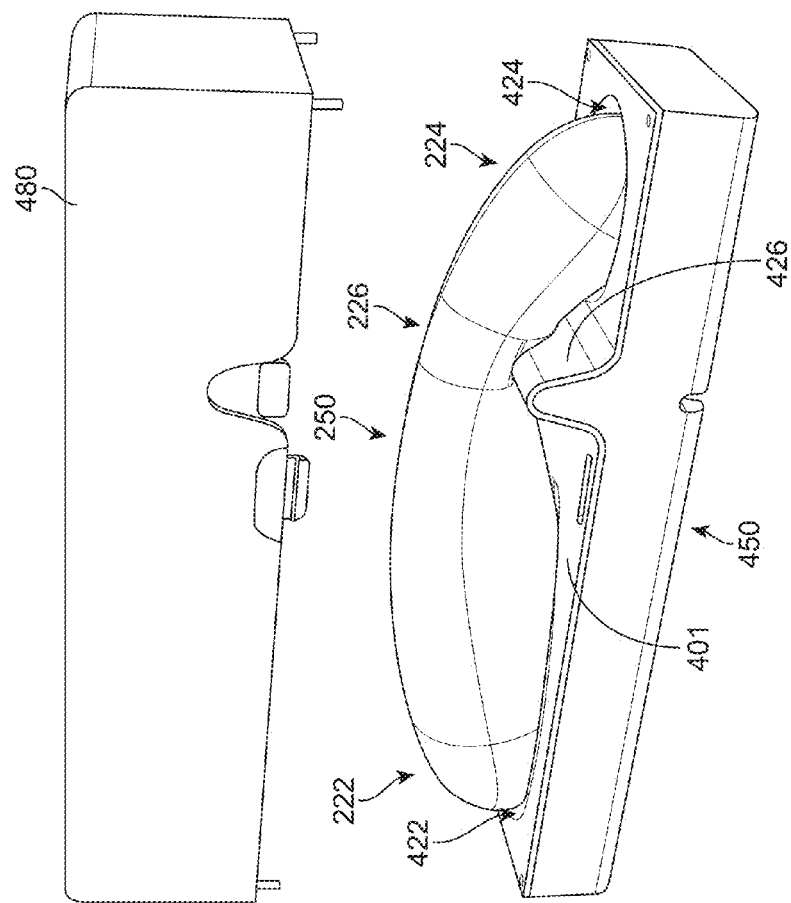
FIG. 12 is a perspective view of the massager of FIG. 9 situated in the base of FIG. 10 with a cover therefor shown exploded therefrom.

The embodiment of base 450 shown in FIGS. 10 and 12 incorporates a physical shape to encourage proper charging, rather than the electronic and magnetic aspects of charger 150 shown in FIGS. 2-8. Base 450 includes an upper surface 401 that includes a pair of depressions 422,424 and a support 426. As shown in FIG. 12 depression 422 is sized to receive operative end 222 of massager 250, and depression 424 is sized to receive operative end 224 of massager 250. Support 426 is shaped so as to cradle the collar portion 226 of massager 250. The interaction of support 426 is such that the upper surface thereof is angled to match the angle of the collar portion 226 when placed in the collar. Because the shape of upper surface 401 matches specific portions of massager 250, massager 250 can only fit in the base 450 in the proper orientation for charging. Accordingly, because contacts 205a,205b cannot touch contacts 403a,403b, the reed switch and magnets of the embodiment of FIGS. 1-9 can be eliminated, which can provide a more robust unit. To prevent shorting between contacts 403a,403b, which is a possibility due to the proximity therebetween, a ridge 470 is positioned between contacts 403a, 403b, which prevents a single conductive element, such as band 204 from shorting the contacts. A mating groove 280 can be formed in the massager 250 between contacts 205a and 205b. Other configurations are possible for base 450 that promote correct charging orientation by shape interaction with massager 250. For example, a base can be formed with a single depression that, for example, fits the profile of the lower half of the massager, with the charging contacts appropriately positioned for charging. Further, mechanical keying features are possible between the base and the massager in which a projection or the like extends from the base to interact with a depression or the like formed in the massager.

Base 450 can further incorporate a lid 480 that can be assembled thereto when massager is held on base 450. This provides for a closed container for massager 250 that improves the hygiene and discretion thereof during storage. Further, lid 480 can be arranged to hold massager 250 against base 450, which is particularly useful during charging to ensure that proper contact is maintained. Lid 480 can further incorporate a locking feature to further enhance the privacy of the unit.

It is to be understood that neither of the above-described embodiments is limiting, and that, accordingly, various aspects of the described embodiments can be interchanged to form additional embodiments.

There have thus been provided new and improved methods and systems for charging a personal appliance such as a personal massager or vibrator that provide secure and safe charging. The described embodiment of the invention includes a hand-held massager 50,250 and a base 150,450, the massager including a rechargeable battery along with vibrating and certain charging functions. The mating charging base houses certain cooperative charging functions. In one embodiment, when the massager and base are engaged in a supporting, charging physical relationship, magnets act to secure at least one of the electrical charging connections between the massager and the base. A reed switch can be included in the charging based that is magnetically operated by a magnet in the massager to enable electrical charging, which is otherwise safely disabled while the massager and base are separate, thereby preventing an electrical shock to a user. In another embodiment, an interrelated profiles between the massager and the base help to ensure proper orientation of the massager on the base to facilitate charging. The charging components can be integrated into the massager in a manner flush with the surface of the massager housing such that the massager surface is smooth and pleasant to the user, cleanable and thus hygienic, and waterproof. Optional skinning can be used to provide a comfortable outer surface, either by over-moldeding or additional assembly. Further, the placement of the electrical components provides tactile, pleasant warmth to the surface of the massager while it is in operation.

The complete list of parts in the massager shown in FIG. 1 is given below. The parts for the embodiment of the massager of FIG. 9 can vary from the listed parts. The parts include: left substrate; right substrate; button plate; top half of metal collar; bottom half of metal collar; metal end plug contact; end plug magnet; end plug rubber o-ring; end plug internal contact; second motor; first motor; first motor mounting bracket; first motor mounting bracket screws; battery; collar internal contact; printed circuit board (PCB) supporting the electrical circuit components shown in FIG. 3; outer layer; magnet; mono-directional moisture barrier, for example of Goretex™ material; and, collar rubber o-ring.

The complete list of parts in the charging base shown in FIG. 2 is given below. The parts included in the massager of FIG. 11 can vary from the listed parts. The parts include: lid; top housing; bottom housing; collar metal contact; end plug metal contact; end plug contact magnet; foam cushion; weight; PCB supporting the electrical reed switch S1 and other electrical circuit components shown in FIG. 4; cord strain relief; rubber feet; screws; label; screw fasteners for securing the PCB; and Adapter for converting AC current to DC current to power the charging circuitry on the PCB, the adapter including a cord connected to cord strain relief.

Alternate Embodiments of the Invention

There is provided herein a new and improved vibrating massager assembly including a vibrating massager, a base and a remote control. The vibrating massager includes an internally contained rechargeable battery and an induction coil with charging circuitry. The base is both supportive and includes inductive coupling equipment for charging the vibrator battery. To take full advantage of the inductive charging features, the vibrating massager is sealed, in the illustrated embodiment by both ultrasonic welding of a plastic housing and skinning with a relatively thin, bio-compatible skin, whereby to effectively protect the massager and improve the human user experience. The remote control of the present invention uses the ZigBee™ wireless communications protocols to control the vibrator and provides vastly enhanced functionality in comparison to the prior art.

As used herein, examples and illustrations are exemplary in nature and not limiting. Like reference numerals between the various Figures indicate like elements.

Structure of the Invention

Figure 13:
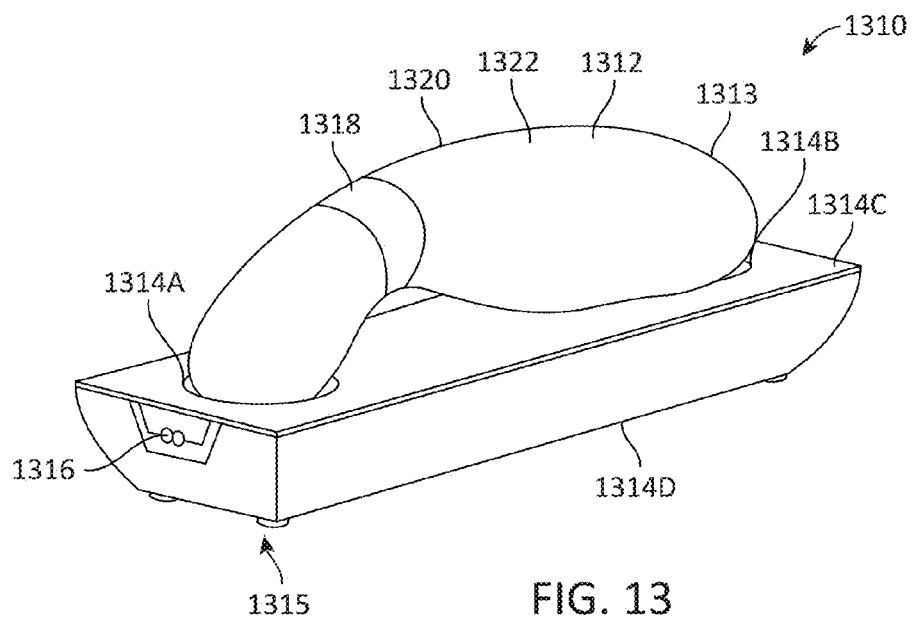
FIG. 13 is a perspective of an inductively chargeable vibrating massager on a charging base, in accordance with one embodiment of the present invention.
Figure 14:
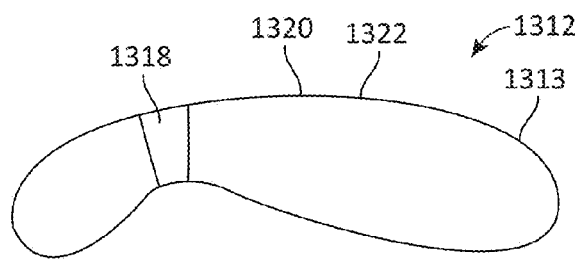
FIG. 14 is a side view of the vibrating massager of FIG. 13.

With reference now to FIGS. 13 and 14 there is shown a new and improved vibrating massager system 1310 including an inductively chargeable vibrating massager 1312 and a supportive, inductive charging base 1314. Vibrating massager 1312 is shown in the shape of a fluid, organic form. The organic form provides a multitude of different types of surfaces suitable for different types of contact with the body, thereby offering flexibility of operation and many varieties of sensation for the user. As shown, the illustrated form is functional to provide medical massage, such as for the neck, back, feet, etc. as well as sexual stimulation.

In the illustrated embodiment, vibrating massager 1312 is sealed first by ultrasonic welding, and further by a thin, bio-compatible 'skin' 1313, formed, for example, from silicone or a thermoplastic elastomer (TPE). Sealing takes full advantage of the benefits of inductive charging, i.e. not having to open the unit to replace batteries or deal with an external cord, preferably making the vibrating massager secure from external fluids and liquids, as well as providing a tactility that is smooth and pleasant to the user. The skin reduces the number of uncomfortable and unsanitary tangible seams in the surface of the massager. In the described embodiment, skin 1313 further forms a relatively waterproof, hermetic seal over the entirety of the vibrating massager 1312, again enhancing both the functionality of the device and the user experience. Alternative methods of sealing the device include sealing of the various plastic components described below, skinning with other materials, and others that are discussed in further detail below and/or will now be apparent to the reader.

Further incorporated within vibrating massager 1312 are two controls, in the form of buttons 1320, 1322, positioned underneath of but visible and operable through skin 1313 and extending into the body of the massager as described below. In the described embodiment, the buttons 1320, 1322 interact with internal switches (described below) while the upper surfaces of the buttons include lights, for example LEDs, indicating their status as described below. A decorative collar 1318, optionally included either on top of or underneath of skin 1313, can be used to decorate the vibrating massager. The decoration can take many forms, including brand display and/or embellishments common to jewelry design such as inlay, plating, inset stones, personalized etchings or engravings, or other customizations. Optionally, collar 1318 may be used to facilitate the mechanical assembly of the device in the manner described below.

Figure 19:
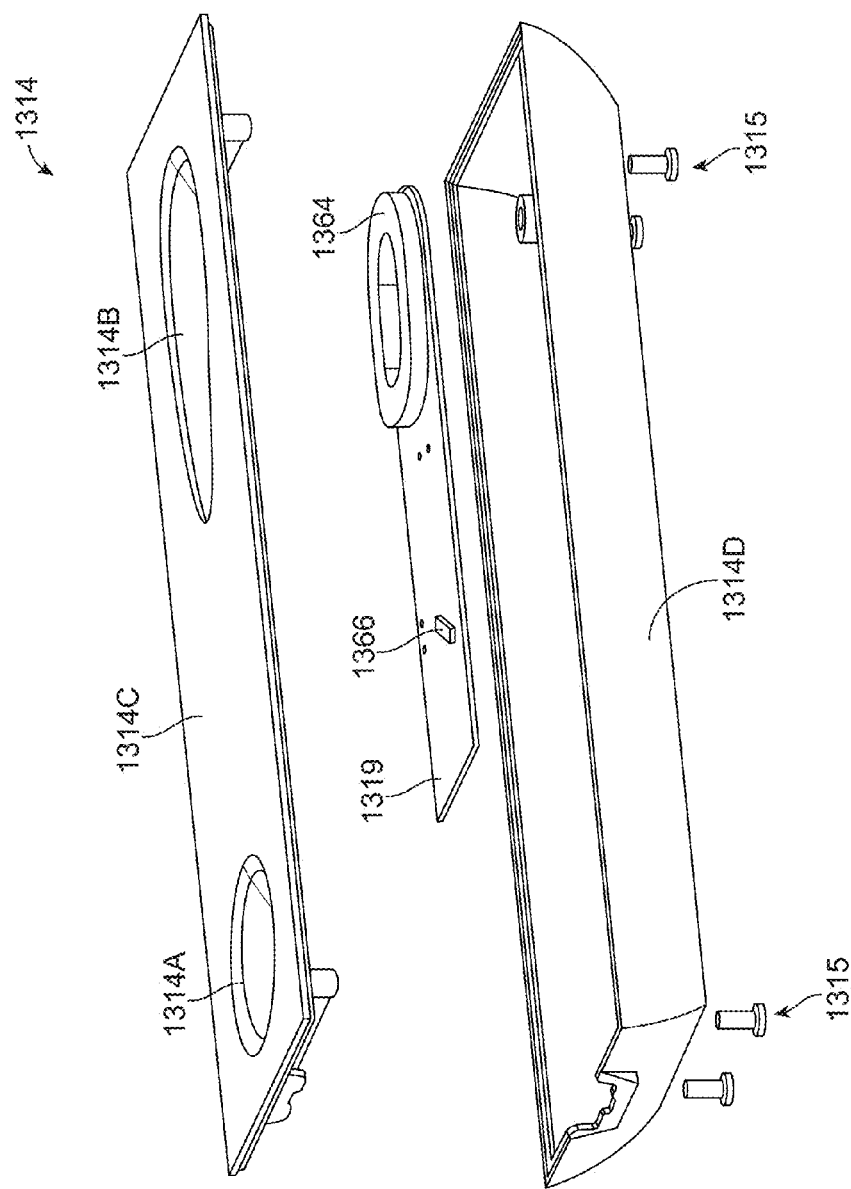
FIG. 19 is an assembly view of the base of FIG. 13.

Continuing with reference to FIG. 13 and now also FIG. 19, charging base 1314 is seen to be relatively 'brick-shaped' or rectangular in shape, and to include a lower surface 1314D for supporting the charger on a flat surface such as a sink, bureau, or bedside table. The charger further includes an electrical connection 1316 for receiving power from an external source such as a 110V or 220V wall plug. An upper surface 1314C of the charging base includes a pair of ovoid indentations 1314A, 1314B for receiving the ends of the vibrating massager 1312 in a supportive, stable relationship. In accordance with features and advantages of the present invention, base 1314 is shaped to receive vibrating massager 1312 in engaging relationship, conveniently and stably supporting the device while it is inductively charged in the manner described herein below.

Internal to the charging base 1314 (as visible in FIG. 19) is seen a circuit board 1319 supporting a power converter 1366 and inductive coil 1364, the functions of which are described herein below. Corner feet, for example in the form of self-adhesive rubber disks, can be used to conceal the screws used to secure top 1314C to bottom 1314D, the screws being indicated generally at 1315.

Figure 15:
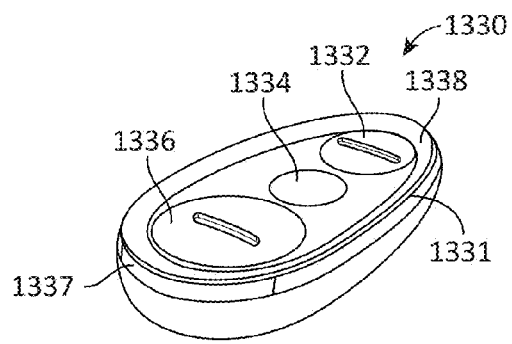
FIG. 15 is a perspective view of a remote control for the vibrating massager of the present invention, in accordance with one embodiment of the present invention.

With reference now to FIG. 15, there is shown the external structure for a remote control device 1330 for controlling the operation of the vibrating massager 1312. In the described embodiment, remote control 1330 is seen to comprise generally the shape of a sectioned ovoid 1337, a flat surface provided by a membrane switch 1338 supporting a variety of controls, in the form of button-controlled switches, indicated generally at 1332, 1334 and 1336. The remote control 1330 is constructed of a pair of mating sides each containing internal structure for supporting various internal components. This external structure of the remote control comprises, for example, a material such as acrylonitrile butadiene styrene (ABS) plastic, polycarbonate (PC), thermoplastic elastomer (TPE), polyethylene, liquid crystal polymer (LCP), cellulose acetate propionate (CAP), nylon, a polycarbonate and ABS blend (PC-ABS) or other materials, thermoplastic or otherwise.

Figure 18:
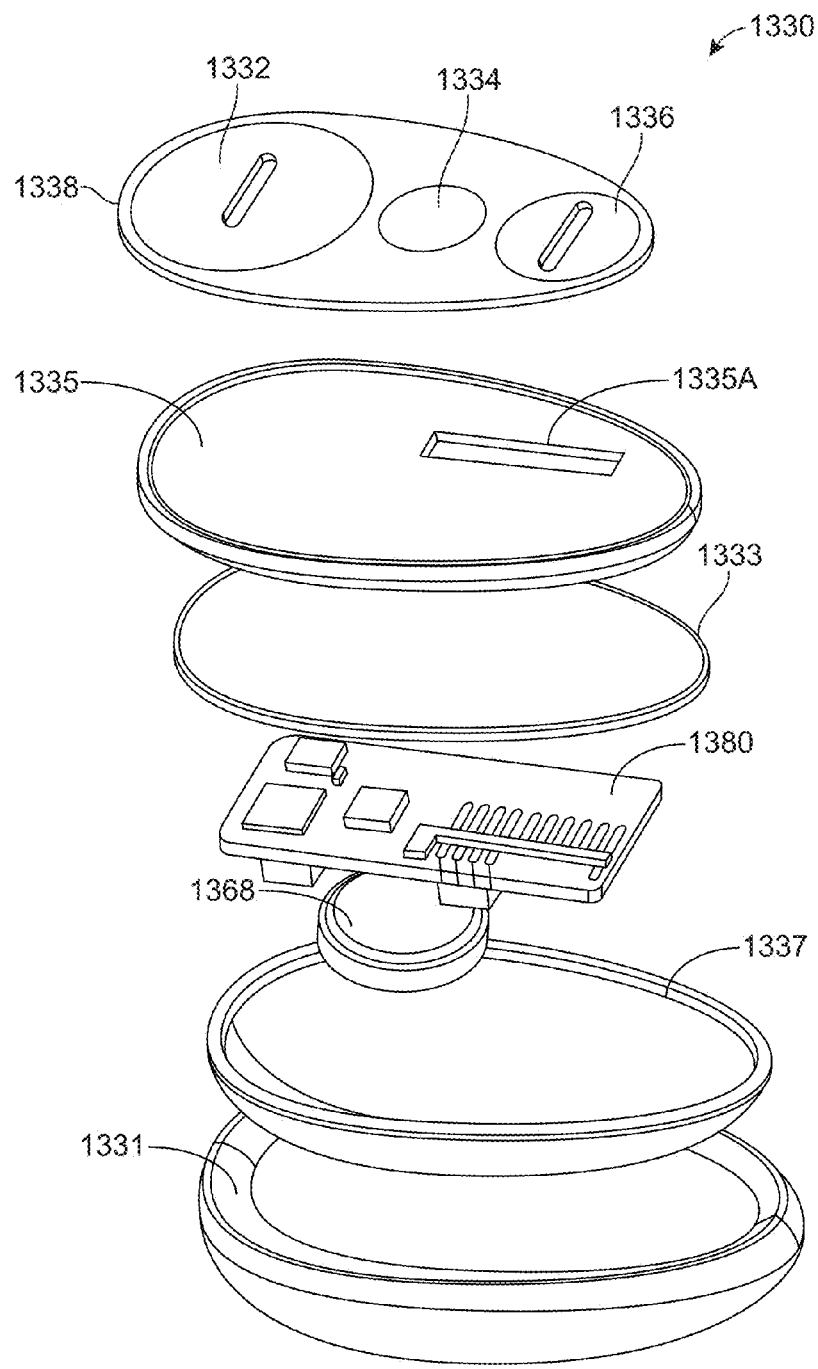
FIG. 18 is an assembly view of the remote control of FIG. 13.

With reference now also to FIG. 18, the internal components of remote control 1330 are seen to include a battery 1368, rechargeable or otherwise, and an electronic circuit board 1380 supporting electrical components including a microcontroller, an antenna, four LEDs, a connector for the wiring to the membrane switch 1338, and additional supporting circuitry as described herein below. The electronic components support a variety of functions including: receiving and processing radio frequency control signals, receiving and processing signals from user operated controls such as button switches 1332, 1334 and 1336, and controlling the illumination of the LEDs. The button switches are of a "membrane switch" type, the switches incorporated within the membrane and operable by the button switches. This construction offers the benefits of being impervious to water and other fluids, smooth and continuous in form such that the surface is easy to keep clean, and inexpensive to manufacture. Button switches 1332 and 1336 each provide access to two momentary switches within the switch membrane. Each of the two buttons can then support a plus/minus functionality to enable the user to intuitively increase or decrease the activity of each of the two motors in vibrator 1312. The various functions of these controls are described in greater detail herein below.

From FIG. 18, it will be seen that the ovoid shape of remote control 1330 is derived from a plastic ovoid housing bottom 1337, with the upper flat surface formed by switch membrane 1338 overlying a plastic housing top 1335. Housing top 1335 includes an aperture 1335A facilitating the electronic connection of button switches 1332, 1334, 1336 with the switches on the circuit board 1380. An oval seal, or o-ring, 1333 provides a seal between housing top 1335 and housing bottom 1337. The various electronic components are contained within the housing, the housing skin 1331 covering the plastic housing components while wrapping over the edge (visible in assembled form in FIG. 15) of switch membrane 1338.

The flat surface 1338, and the raised planar edge of the housing skin 1331 enables the remote control device 1330 to rest "face-down" thereby concealing the controls and giving the device a unique, clean and appealing aesthetic appearance. As described above, in the illustrated embodiment, remote control device 1330 is sealed with a rubber o-ring 1333, and further sealed by a removable, thin, bio-compatible 'skin' 1331, formed, for example, from silicone or a thermoplastic elastomer (TPE). This sealing makes the remote control device 1330 secure from external fluids and liquids, as well as providing a tactility that is smooth and pleasant to the user. The skin reduces the number of tangible seams in the remote control, improves the user's grip on the device, and protects the device from shock when dropped. The remote control outer skin 1331 can also permit the remote control device 1330 to attach via suction to a smooth surface, such as glass, tile, mirror, or the side of a bathtub, providing a useful and unique means of storing the device when it is not in use. In the described embodiment, the skin forms a secondary waterproof seal over the convex portion of the remote control device, again enhancing both the functionality of the device and the user experience. Alternative methods of sealing the device include sealing of the various plastic components such as by ultrasonic welding, skinning with other materials, and others as will now be apparent to the reader.

Figure 16:
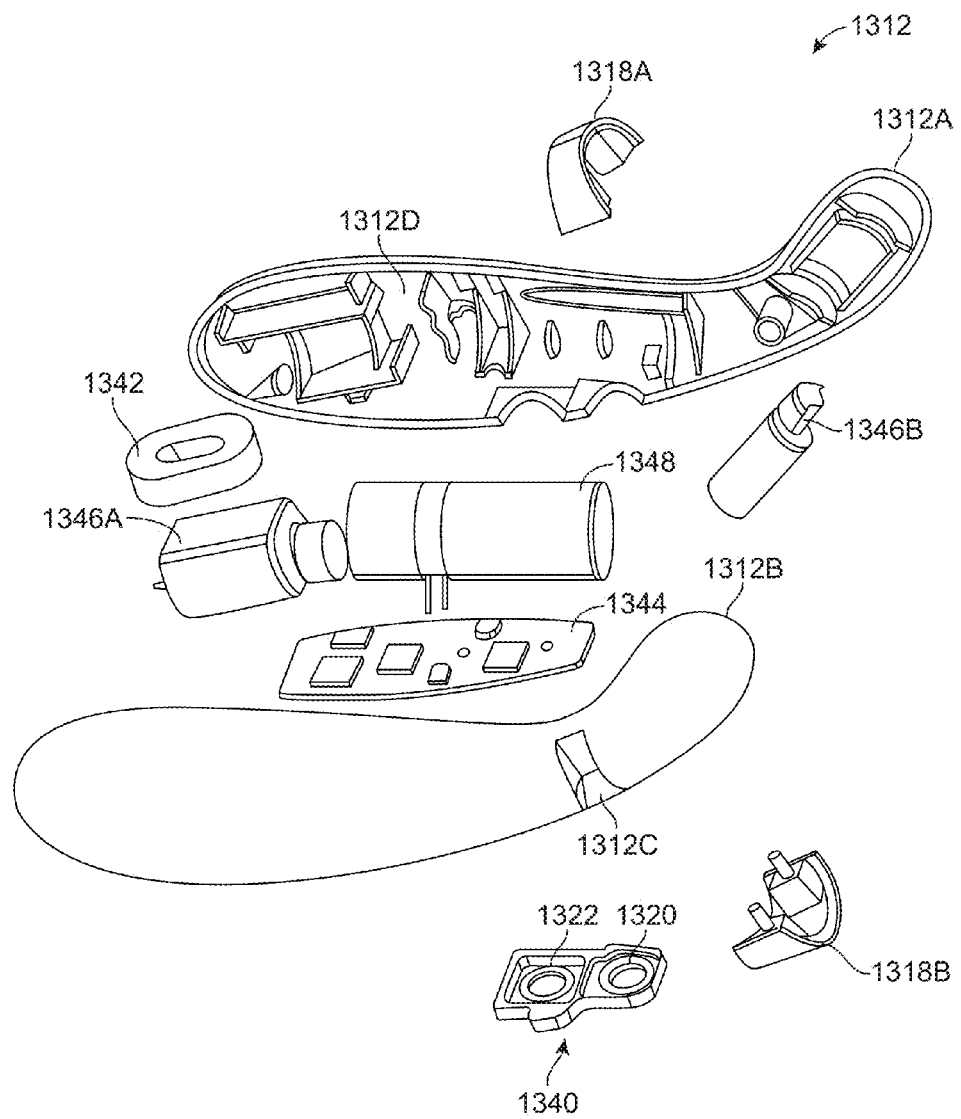
FIG. 16 is an assembly view of the vibrating massager of FIG. 13.
Figure 17:
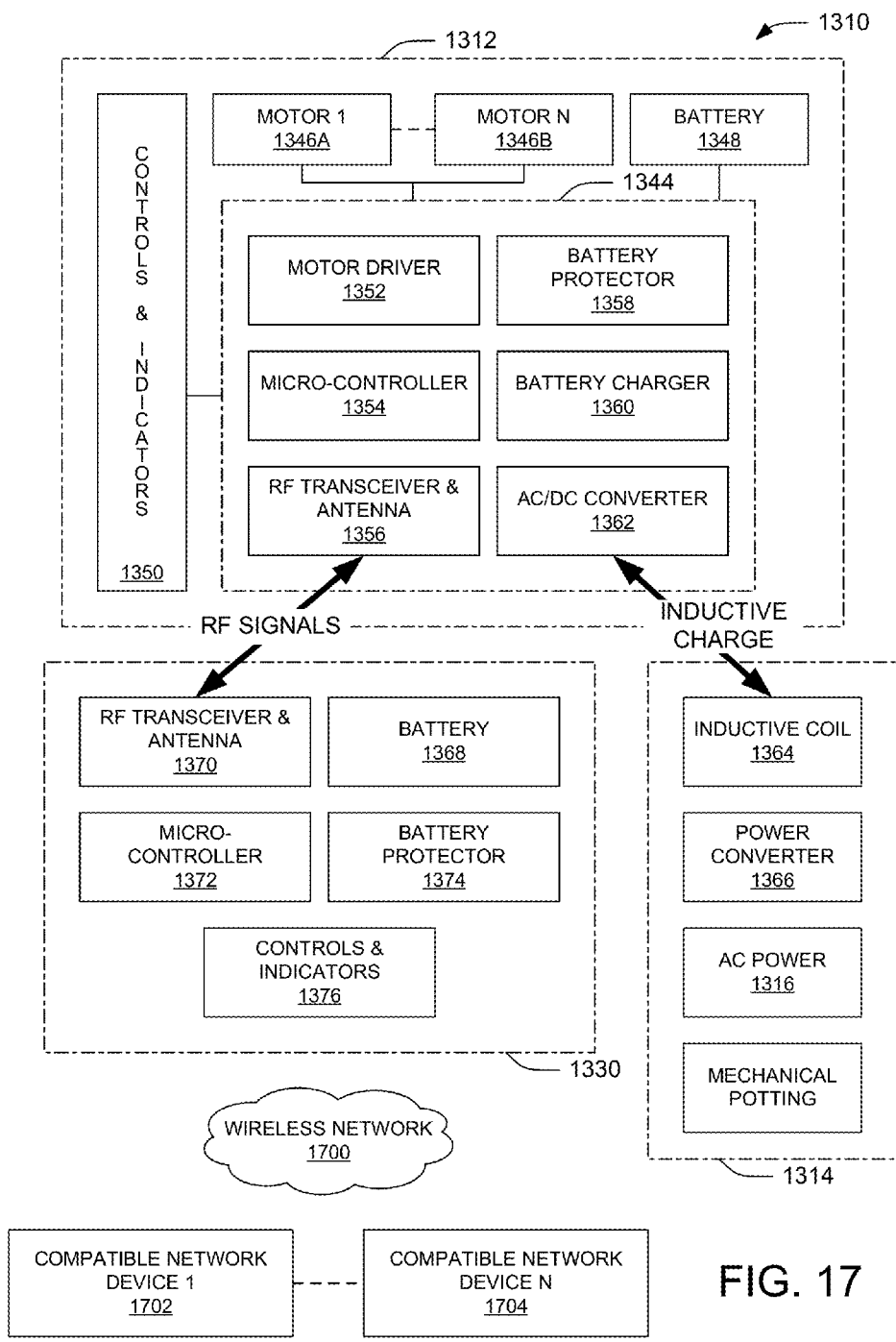
FIG. 17 is a block diagram view showing the functional components of the vibrating massager, inductive charger and remote control, in accordance with one embodiment of the present invention.

The electro-mechanical structure and function of system 1310 will now be described with respect to FIGS. 16 and 17, FIG. 16 showing an assembly view of vibrating massager 1312, FIG. 16 showing a block diagram functional view of the massager, base 1314 and remote control 1330.

With reference first to FIG. 16, there is shown a mechanical assembly view of vibrating massager 1312, the massager including a pair of mating sides indicated at 1312A, 1312B each containing internal structure 12D for supporting various internal components. This external structure of the massager comprises, for example, a plastic or thermoplastic as described above.

The internal components of vibrating massager 1312 are seen to include an energetic coupler such as an inductive charging coil 1342, a power source such as battery 1348, and a pair of vibrating motors indicated at 1346A, 1346B. An electronic circuit board 1344 supports electrical components, further described herein below, for a variety of functions including: supporting the charging of battery 1348, receiving and processing radio frequency control signals, receiving and processing signals from user operated controls such as buttons 1320 and 1322, and controlling the operation of motors 1346A, 1346B.

As is apparent from FIG. 16, when assembled, motors 1346A, 1346B are positioned at generally opposite lateral ends of massager 1312, the circuit board 1344, battery 1348 and inductive coil 1342 generally supported towards the center of the device. The switches 1320, 1322 are towards the center of the device. This assembly provides vibrating massager 1312 with a pleasant balance to the user and convenient access to the switches when the massager is held in a user's hand, regardless of the orientation of the device. It is noted that, in accordance with a feature of the invention, the motors 1346A, 1346B are arranged at opposite ends of vibrating massager 1312, enabling the massager to be used at both ends. The motors are of different sizes and offer different operating characteristics. Motor 1346A is a large motor with a relatively larger vibration weight mounted on its axle. This motor is thus configured to produce very strong, lower frequency vibrations. Motor 1346B is a smaller motor with a relatively smaller vibration weight mounted on its axle. This motor is thus configured to produce higher frequency vibrations, and to be able to respond more nimbly to intricate control signals. The motors are positioned non-linearly on different longitudinal axes within vibrating massager 1312. The massager thus has the advantage of providing significantly different tactile sensations to the user depending on the motor(s) operated and surface(s) applied to the body. Further, when both motors operate simultaneously, the two frequencies of vibrations generated can interfere or resonate, thereby generating additional sensations for the user.

It will be understood that, in different embodiments, different numbers and types of motors may be operated and different numbers of controls may be provided directly on the housing of the vibrating massager 1312.

In the illustrated embodiment, decorative collar 1318 is seen to include a pair of matching halves, indicated at 1318A, 1318B, the collar halves engaged in a pressure relationship with one another and keyed into slots 1312C (only one of which is visible) for supporting the construction of the massager 1312 by assisting to hold mating halves 1312A, 1312B together.

A button assembly 1340 is seen to include individual button switches 1320, and 1322, in the described embodiment the switches comprising momentary switch, pressure sensitive electronic switches with light emitting diode (LED) indicators indicative of their state. The buttons protrude through the surface of massager 1312, remaining underneath skin 1313 to support the operation of the massager in the manner described herein below.

While not illustrated in FIG. 16, as noted above; vibrating massager 1312 includes a bio-compatible external skin 1313 (see FIG. 13), comprised for example of silicone, thermoplastic elastomer (TPE), thermoplastic urethane (TPU) or another material with desirable properties such as tactile quality, biocompatibility, durability, and ability to bond to the material of parts 1312A and 1312B. This skin may be of varying thickness, providing different levels of firmness or softness around the body of the device, thereby enhancing as well as increasing the number of tactile properties available from the vibrating massager.

With reference now to FIG. 17, considering first the functional operation of vibrating massager 1312, the circuit board 1344 is seen to include a variety of electronic components, controlled by a microcontroller 1354. Microcontroller 1354 comprises, for example, a low power, 8 bit, 8 MHz microprocessor, 64 Kb of flash memory, 4 Kb of static ram, 2 Kb of EEPROM, and two pulse width modulation (PWM) channels, many commercial types of which are well known in the art, for example from suppliers such as Intel, IBM, AMD, Texas Instruments, EM Microelectronics, Hitachi and Xemics.

Inductive coil 1342 is connected to a charging control and monitoring circuit on circuit board 1344 and positioned so as to couple electro-magnetically with a corresponding coil 1364 in charger 1314, thereby inductively generating a current to charge battery 1348. An A/C-to-D/C converter 1362 operates to convert the induced current to a D.C. voltage, the voltage supplied to a battery charger 1360 for charging battery 1348. A battery protector 1358 is connected to battery charger 1360 in a conventional manner to minimize charge time, maximize battery life, and avoid overcharging of the battery. A motor driver 1352 is provided for generating the control signals to drive motors 1346A, 1346B responsive to the control signals applied and as determined by microcontroller 1354, the details of which are described below.

Inductive coil 1342 is a wound coil with a ferrite core, selected to provide efficient coupling across the precise distance between the primary and secondary coils in the charger and vibrator, respectively. In a manner well known in the art, coils 1342 and 1364 may be procured off-the-shelf and/or manufactured to specifications dependant on their desired relative positions and performance. Battery 1348 is a conventional high capacity rechargeable battery, such as a lithium ion type battery. Converter 1362 is a conventional AC/DC converter that rectifies the incoming, inductively coupled 100 KHz AC signal to generate the 6V DC power required to drive the charger 1360. Battery charger 1360 is a conventional component designed to handle the complex charging requirements of a high capacity battery. Battery protector 1358, another conventional component, protects the battery 1348 from over-voltage, under voltage, over-current/short circuit, and over-temperature conditions. Battery charger 1360 and protector 1358 can be in the form of an integrated circuit(s), for example of the type available from Linear Technology.

A radio frequency transceiver and antenna 1356 is included for receiving radio frequency control signals, in the ZigBee™ wireless communications protocol, from remote control device 1330 or other control devices as described below. The received signals are operative with microcontroller 1354, motor driver 1352 and the user controls and indicators 1350 for controlling the operation of the motors 1346A, 1346B. In this described embodiment of the invention, microcontroller 1354 and the motor driver 1352 operate to provide pulse width modulation control of the motors 1346A, 1346B, this PWM control providing significant advantages as described here in below.

It will be understood that the controls and indicators 1350 include the controls and indicators physically mounted on vibrating massager 1312 for direct operation by a user of the massager. In the described embodiment, these controls include buttons 1320 and 1322 that interact with the above-described switches on circuit board 44. It will be understood that in different embodiments, numerous other user controls and indicators may be included on the physical structure of vibrating massager 1312.

Continuing with reference to FIG. 17, considering now the functional aspects of charger 1314, the charger is seen to include an alternating current (A/C) power source 1316, for example a corded connection to a conventional 110V/220V external power source. Charger 1314 further includes the power converter 1366 for converting the frequency of the A/C power, and an inductive coil 1364 for inductively coupling the converted power to inductive coil 1342 whereby to charge battery 1348. Power converter 1366 is composed of a passive component circuit for converting 50 Hz or 60 Hz AC to DC and an active switching component for converting this DC voltage to 100 KHz AC. As described above with respect to coil 1342, inductive coil 1364 is comprised of a wound coil with a ferrite core, selected to provide efficient coupling across the precise distance between the primary and secondary coils in the charger and vibrator, respectively.

In the described embodiment, the various electronic components within the base 1314 are potted within an epoxy or an equivalent sealant whereby to provide both a waterproof seal and a weight sufficient to securely support vibrating massager 1312 during charging and/or non-use. The outer housing of base 1314 is preferably plastic, but may be manufactured from or further include other functional or aesthetic materials. The charger 1314 can incorporate other desirable features or take a multitude of alternate forms, for example, the charger could incorporate cable management system for the A/C power cable. Alternatively, the charger could be incorporated into a box or similar enclosure to aide privacy, security, and transportation, or into a soft structure such as a pillow so that it could be stored on a bed and blended with other pillows. The vibrator could also engage with the charger in different orientations, for instance, it could stand vertically in the charger. Further, the charger could be optimized to be used universally for a variety of compatible vibrators, remotes, or other powered products.

In another embodiment, the charger could be used in conjunction with an external packaging design that incorporated induction coils within the packaging itself, for example, a bottle or other container having an induction coil therein. The power generated by the inductively coupled coils, that is between the coil in charger 1314 and the coil in the external package, could be used for the illumination of the package (if the packaging incorporated an LED or other light source), or for the warming of a product contained within the packaging. Thus, for example, in addition to functioning to charge massager 1312, base 1314 could simultaneously function to warm a receptacle of a liquid medicinal or oil.

With reference now to remote control 1330, the functional components as shown in FIG. 17 are seen to include a microcontroller 1372 for controlling the various components of the remote control. The battery 1368 and an optional battery protector 1374 are provided for powering the remote control. An RF transceiver and antenna 1370, mentioned herein above, are provided for generating and communicating RF control signals in the ZigBee™ wireless communications protocol to the corresponding transceiver 1356 in vibrating massager 1312. In one embodiment, the ZigBee™ functionality is provided by firmware residing in the memory of the microcontrollers 1354 and 1372, and is processed by the microprocessors. In other embodiments, the ZigBee™ functionality is incorporated into the RF transceivers 1356, 1370 and/or in a ZigBee™-functional integrated circuit coupled to the microcontrollers and/or the transceivers. Controls and indicators 1376, including the illustrated button switches 1332, 1334 and 1336, are included for enabling a user to remotely control the operation of vibrating massager 1312 in accordance with the description herein below.

The various components of remote control 1330, including a battery 1368, battery protector 1374, microcontroller 1372, the various RF transceiver components 1370, and the controls and indicators 1376, comprise conventional components well known to the reader. Microcontroller 1372 comprises, for example, an 8 bit, low power, 8 MHz processor with 64 Kb of flash memory, 4 Kb of static ram, 2 Kb of EEPROM, of the type generally described above with respect to microcontroller 1354, and further including an optional, conventional integrated and/or interconnected analog-to-digital converter circuit. Battery 1368 is a high capacity, high voltage battery such as a lithium or lithium ion type battery. The optional battery protector 1374, for example of the type described with respect to protector 1358 above, protects the battery 1368 from over-voltage, under voltage, over-current/short circuit, and over-temperature conditions. A conventional radio frequency transceiver and antenna 1370 is included for receiving radio frequency control signals in the ZigBee™ wireless communications protocol from vibrating massager 1312 or other devices.

Referring again to FIG. 17, for purposes of illustrating the vibrator system of the present invention in a network of compatible wireless devices, two such devices 1702, 1704 are shown connected with system 1310 in a ZigBee™ wireless network 1700 configuration. The reader will understand that devices 1702, 1704 can comprise one or more of the below-described devices, sensors and/or systems, each ZigBee™ wireless compatible and communicating in the network with each other and/or system 1310 using the wireless protocols as described below.

Construction of the Invention

In construction, as described above, the two motors 1346A, 1346B are positioned at opposite ends of the vibrating massager 1312, whereby to apply vibratory motion to either end selectively and/or the entirety of the massager. In the described embodiment, motor 1346B is relatively smaller than 1346A, each motor fitted with an offset weight attached axially whereby to impart vibrations to the massager. As described above, in the illustrated embodiment, the motors are positioned offset axially from each other. It will be appreciated that the relative size, position and function of the motors and rotating weights are selected to provide the desired vibratory effects to massager 1312. Different configurations may be selected to provide different vibratory effects for medical treatments as well as for adult sexual stimulation.

In the described embodiment, the two halves of the vibrating massager 1312, indicated at 1312A, 1312B (see FIG. 16) are ultrasonically welded together so as to seal the device against moisture and other outside pollutants. The skin layer 1313 is then over-molded onto the outside of the sealed housing, providing both a hygienic effect and reinforcing the waterproof seal of the ultrasonic weld.

Operation of the Invention—Inductive Charging

In operation, as noted above, the charger 1314 includes an upper surface 1314C that supports the vibrating massager 1312 and guides it into a specific orientation which optimizes the inductive coupling between the inductive coils 1342 and 1364 in the two units.

When the vibrating massager 1312 is placed on the charging base 1314 in the proper position, LEDs located beneath buttons 1320 and 1322 on the massager illuminate for one second to indicate that the inductive coil 1362 in the charger and the inductive coil 1342 in the massager have coupled successfully, and that charging is underway. This one second illumination is followed by a series of short flashes, 250 ms in duration, which indicate the current charge level as follows:

| Number of Flashes | Charge Level |
|---|---|
| 1 | Very Low |
| 2 | Low |
| 3 | Medium |
| 4 | High |
| 5 | Full |

Alternatively such feedback may be provided by an audio device such as a speaker or beeper, or by tactile feedback such as vibration, or other forms of user-discernable feedback as will be apparent to the reader.

The charging of battery 1348 in vibrating massager 1312 is controlled by circuitry in power converter 1366 that optimizes charging time and battery life. The charging functionality in the described embodiment is optimized for the use of a single lithium-ion type battery 1348. Other types of rechargeable batteries, such as nickel metal hydride (NiMH) or multiple batteries and/or battery types could be used in the massager, with the charging functionality then optimized for those battery configurations.

The vibrating massager 1312 reacts intelligently to its charging status. The massager can indicate its battery level (e.g. fully discharged, low, medium, high, or fully charged) by flashing its LEDs in the pattern indicated above. The massager will cease motor operation before the batteries are fully drained so that it can maintain other basic functions, such as radio frequency communication with remote control 1330 or indication of status via the illumination of the LEDs. In the described embodiment, the massager cannot be turned on when in the charger and, if the massager is vibrating when it is placed in or near the charger, it will automatically shut off.

In addition to the advantages described above, including no need to change batteries or deal with electrical cords, inductive charging provides the significant advantage of generating exothermic heat, providing vibrating massager 1312 with a palpably warm, pleasant sensation to the user.

Operation of the Invention—User-Controlled Operation

As will be apparent to the reader, at least two methods of directly operating vibrating massager 1312, are readily available to the user, the first comprising the operation of the buttons 1320, 1322 directly on the housing of the massager.

This operation is described with respect to Table 1 below, wherein:

TABLE 1

| | |
|---|---|
| Switch 1320 | Pressing switch 1320 when motor 1346B is off will turn motor 1346B on at low speed<br>Pressing switch 1320 again will speed up motor 1346B to medium speed<br>Pressing switch 1320 a third time will speed up motor 1346B to high speed<br>Pressing switch 1320 a fourth time will return motor 1346B to being off |
| Switch 1322 | Pressing switch 1322 when motor 1346A is off will turn motor 1346A on at low speed<br>Pressing switch 1322 again will speed up motor 1346A to medium speed<br>Pressing switch 1322 a third time will speed up motor 1346A to high speed<br>Pressing switch 1322 a fourth time will return motor 1346A to being off |
| Control Lock | Pressing and holding either switch 1320 or switch 1322 for 2 seconds will turn off both motors and will put the massager in a locked state.<br>When the massager is locked, pressing switch 1320 or switch 1322 momentarily will have no effect.<br>Pressing and holding either switch 1320 or switch 1322 for 2 seconds when it is in a locked state will return the massager to an unlocked state. When switch 1320 or switch 1322 is then released, the LEDs beneath both switches will flash to indicate current battery level, per the description above. |
| Pause and Resume | If one or more motors are on, pressing both switch 1320 and switch 1322 will turn off all motors and will put the massager in a paused state.<br>When the massager is paused, momentarily pressing switch 1320 or switch 1322, or both switches simultaneously will cause the massager to return to the same level of activity prior to being paused. |
| Network Formation | Pressing and holding both switch 1320 and switch 1322 for 5 seconds will turn off any motor that is on and will cause the massager to broadcast a request to form a network.<br>The massager will continue to broadcast the request for 5 seconds after one or more switches are released. Both LEDs will flash rapidly as long as the request is being broadcast.<br>If, while broadcasting a request to form a network, the massager receives an acknowledgement from another device, it will add the device to the network, and will then continue to broadcast its request to form a network for an additional 5 seconds.<br>If, after 5 seconds of broadcasting a request to form a network, the massager does not receive an acknowledgement from another device, it will cease to broadcast the request and will complete the network formation with the devices, if any, that provided an acknowledgement during the network formation cycle described above. |
| Special Functions | Specific sequences of button presses can be programmed to access special vibration patterns and modes that are otherwise inaccessible to the user. This "hidden" functionality is similar to "cheat codes" embedded in video games. These specific sequences can be released to users for example as part of a marketing campaign for the massager. |

It will be understood by the reader that the operation of controls 1320, 1322 are managed by microcontroller 1354 and that many different variations of the control functions described may thus be programmed into the vibrating massager of the present invention.

In the described embodiment of the invention, motors 1346A, 1346B are operated by motor driver 1352 using pulse width modulation (PWM). As is known in the art, PWM uses the duty cycle of the control signal to control the motor operation. At full power, the PWM circuit provides power to the motors 100% of the time. At partial power, the PWM circuit provides power to the motors the same partial percentage of time. In accordance with this aspect of the present invention, PWM control of the motors provides enhanced responsiveness in comparison to conventional amplitude modulation control. This provides significant advantages, including the ability to operate the motors at lower speeds, providing low frequency vibrations, as well as the ability to provide fine control of the motor operation in accordance with the relatively complex control signals described below.

Operation of the Invention—Remote Control Operation

It will be apparent to the reader that at least the same functions described above with respect to the user controls 1320, 1322 can be applied remotely using controller 1330. Due to the inclusion of additional buttons, that is five button switch functions on remote control 1330 versus two button functions directly on the massager 1312, further functions of the vibrating massager are available using the remote control 1330 as described.

As described above, there are three button switches 1332, 1334 and 1336 on the remote controller that are used to provide control of the massager in wireless operation, either individually or as part of a network. Two of the three button switches, 1332 and 1336, interact with two-each underlying, momentary control switches (incorporated within the membrane surface 1338, see FIG. 18) to provide bi-directional control. Such bi-directional control provides +/−, or 'increase/decrease,' functionality to intuitively increase or decrease the activity of two motors or other controllable features. The center button switch 1334 is not bi-directional, but operates a single underlying momentary contact switch, also incorporated within the membrane surface 1338. When depressed individually, each of the bi-directional button switches controls a separate motor. Bi-directional button switch 1332 controls motor 1346B, and bi-directional button switch 1336 controls motor 46A.

With respect to bi-directional button switch 1336, eight discrete motor speeds for motor 346B can be accessed by pressing and releasing the button switch up (36U) or down (36D). More particularly:

Pressing and releasing button switch 1336U will increase the speed of motor 1346B to the next higher speed until it reaches its maximum speed.

Pressing button switch 1336U when motor 1346B is at maximum speed will have no effect.

Pressing and releasing button switch 1336D will decrease the speed of motor 1346B to the next lower speed until it turns off.

Pressing button switch 1336D when motor 1346B is off will have no effect.

Pressing and holding button switch 1336U will cause motor 1346B to gradually and linearly increase in speed until it reaches its maximum speed. When button switch 1336U is released, motor 1346B will maintain whatever speed it has reached.

Pressing and holding button switch 1336D will cause motor 1346B to gradually and linearly decrease in speed until it stops. When button switch 1336D is released, motor 1346B will maintain whatever speed it has reached.

The operation of bi-directional button switch 1332 is identical to that of button switch 1336, but with respect to the control of motor 1346A.

In contrast to the operation of button switches 1332 and 1336, button switch 1334 functions to operate preset vibration patterns and/or combinations of patterns. More particularly:

Pressing and releasing button switch 1334 causes the massager to cycle through different vibration combinations according to the following Table 2. With each press of the button, the vibrator steps to the next combination. For example, if the massager is following combination 2 and button 1334 is pressed, it will switch to combination 3. If button switch 1334 is pressed when the massager is following combination 5, it will return to combination 0.

If a button is pressed on the massager, regardless of what combination the massager is in, the massager switches to combination 0.

Pressing and holding button switch 1334 for 3 seconds will cause the controller to reply to a request to form a network from a massager or other device by sending the ZigBee™ PAN ID (Personal Area Network Identification) of the controller to the requesting device. If a network is found, all LEDs will flash in a repeating sequence from LED 1 to LED 2 to LED 3 to LED 4 while network formation is occurring. All four LEDs then flash 3 times together to indicate successful completion of network formation. If no network is available to join, two of the LEDs will flash, then the other two LEDs will flash in an alternating pattern that is repeated 5 times to indicate a network formation error.

TABLE 2

| Combination | Motor 1 Activity | Motor 2 Activity |
| --- | --- | --- |
| 0 | Constant vibration | Constant vibration |
| 1 | 0.25 Hz slow sinusoidal pattern | 0.25 Hz slow sinusoidal pattern, +180 degree phase shift |
| 2 | 1 Hz fast sinusoidal pattern | 0.25 Hz slow sinusoidal pattern, +180 degree phase shift |
| 3 | 1 Hz fast sinusoidal pattern | 1 Hz fast sinusoidal pattern, +180 degree phase shift |
| 4 | 2 Hz fast square wave pattern | 2 Hz fast square wave pattern, 0 degree phase shift |
| 5 | 2 Hz fast square wave pattern | Constant vibration |

The button switches 1332, 1336 in combination provide other functions, particularly:

If no motor is on, simultaneously pressing button switch 1332U or 1332D and button 1336U or 1336D will have no effect.

If one or more motors are on, simultaneously pressing button switch 1332U or 1332D and button switch 1336U or 1326D will turn off all motors and will put the massager in a paused state.

When the massager is paused, momentarily pressing button switch 1332U, 1332D, 1336U, or 1336D, or pressing both button switch 1332U or 1332D and button switch 1336U or 1336D simultaneously will cause the massager to return to the same level of activity prior to being paused.

As also discussed below, specific sequences of button switch presses can be programmed to access special vibration patterns and modes known to the manufacturer and, unless disclosed, otherwise inaccessible to the user. This functionality is similar to "cheat codes" embedded in video games. These specific sequences can be released to the public periodically as part of a marketing campaign for the controller.

Operation of the Invention—Wireless Network & Control Signal Operation

The ZigBee™ functionality used in the present invention provides significant advantages over its closest competitor, BlueTooth™, another well-known wireless communications protocol. As is known in the art, BlueTooth™ compatible devices are relatively high power-consumption devices using frequency-hopping technology and generally limited to 7 nodes, or devices, in a picocell. In comparison, ZigBee™ compatible devices utilize the ZigBee™ protocol stack, consume relatively less power, use direct-sequence spread spectrum (DSSS) technology in the IEEE 802.15.4 standard and enable more devices, in fact a relatively unlimited number of devices, within each network. ZigBee™ compatible devices further provide a broadcast mode of local communication to send out data to any compatible device, a multicast mode of local communication to send out data to one or more specified devices and the ability to self-organize into a mesh network, further discussion of which is had below.

Considering the advantages provided by the ZigBee™ functionality in comparison to BlueTooth™, the present invention provides: i) significantly lower power consumption, ii) concomitant lower hardware costs, and iii) the ability to more easily and straightforwardly connect large numbers of compatible devices in complex network configurations. More particularly, ZigBee™ compatible devices such as those shown here can operate in both a "many-to-1" configuration, e.g. many controllers controlling a single device, or a "1-to-many" configuration, e.g. one controller controlling multiple devices, the latter being a capability believed to not be offered by BlueTooth™. While ZigBee™ communications protocols can currently be applied in a variety of frequencies, including 900 MHz and 2.4 GHz signals, in the described embodiment of the invention, the broader bandwidth 2.4 GHz frequencies are used, providing advantages including more sensitive controls and international regulatory agency compatibility. This bandwidth enables transmission and receipt of complex control signals, with sufficient resolution (250 kilobaud) to cause a device to respond accurately and contemporaneously to signals as complex as a musical audio or other complex control signals.

In different embodiments, the present invention takes advantage of the ZigBee™ broadcast mode or multicast mode of operation and/or the ability to straightforwardly assemble compatible devices into a self-organizing mesh network(s). Using these capabilities, massager 1312 and/or remote control 1330 can both transmit their availability for networking with other compatible devices within communications range, and subsequently self-organize into networks with available devices. These features give the present invention the capability to operate in different modes of operation, for example: as described above, one controller can control one or many massagers, multiple controllers can control a single massager and, multiple groupings of controllers and massagers can operate in the same space without interfering with one another. It further provides the invention with the ability to network with many other types of devices and interact with many different control signals and controller arrangements as described herein below.

As noted, all devices that share a compatible implementation of the ZigBee™ protocol, including other types of devices, are able to inter-operate with one-another. If a user, for example, tires of a particular vibrating massager's operation, they can simply purchase a new remote control with different operating characteristics, and the massager will take on any new characteristics and capabilities programmed into the new controller. Conversely, a user can add a new massager with a new physical form and/or mechanical capabilities and it will be operable with any ZigBee™-compatible controller that the consumer already owns.

Other ZigBee™ functional devices can interact with the vibrating massager. For example, vibrating massager 1312 can collect data and interpret and respond to this data. The massager can transmit internally generated and/or externally received data to other devices and systems within communications range. As examples, one or more biofeedback sensors can be used to detect one or more bodily functions such as a level of arousal as indicated by a heart rate, respiratory rate, body temperature, galvanic skin resistance, blood flow, muscular activity, neural activity, etc., the bodily function data used to control the operation of the massager. Location sensors can detect positional data such as location, orientation, acceleration, etc. Environmental sensors can detect conditions such as sound, pressure, temperature, light, etc. All of these conditions, data and information can be transmitted to and received by remote control 1330 or other controllers, or sensor devices in the network and/or directly by massager 1312 and be used alone or in combination with programmed instructions in the microcontrollers to control the operation of the massager.

Sophisticated control systems can be implemented to control the operation of the vibrating massager 1312. Audio-sensing controllers can generate control signals based on environmental sounds, music, voices, voice commands, etc. Alternative input mechanisms such as pressure sensors can be used to generate control signals based upon pressure. Touch pads, such as those used as a pointing device on laptop computers, can provide a relatively simple interface for generating complex control functions. Other control systems based on other pre-existing forms of human-machine and human-computer interaction can be used.

MIDI systems can be used to provide a sophisticated interface for the generation of complex control signals for vibrators alone or in a network with other devices. Alternatively, MIDI signals used for the performance of musical compositions can be reinterpreted as control signals for vibrators alone or in a network with other devices, such that the devices would react synchronously with the composition.

While the invention has been generally described with respect to the transmission of control signals from remote control 1330 to massager 1314, the reader will understand that the ZigBee™ protocols provide for bidirectional communications. That is, massager 1314 can transmit both control and informational data back to remote control 1330, or to any other device within the network.

A ZigBee™-compatible, wireless transceiver can be attached to a computer such as a personal computer, portable computer, networked computer or handheld computer, or to a communications device or other electronic device via a USB, FireWire™, parallel, serial, or other input/output port. This transceiver can then be used to receive and send signals to and from the network. Signals generated by a computer or other device can be based upon, for example:

GUI (graphical user interface) programs which can provide users with sophisticated computer interfaces for generating fine GUI-based interaction with one or more massagers or other devices, User programmed signals useable to interact with one or more massagers or other devices can be created, used and stored; these signals can also be shared, embedded in devices, or sold online or through other outlets, Special media played on a computer or other device can be encoded with a control track that causes one or more massagers or other devices to behave in synchronization with the media being viewed or heard; additionally, the media could itself be controlled or altered in response to signals received from the network, Standard media, without a pre-programmed control track, played on a computer or other device, could be interpreted by software, firmware, or hardware and used to cause one or more massagers or other devices to behave in synchronization with the media being viewed or heard, Interactive games played on the computer, individually or in a networked configuration, can generate or respond to signals sent to or received from massagers or other devices, Online peer-to-peer, remote interaction with others online, including chat rooms, virtual communities, dating services, etc. can generate or respond to signals sent to or received from massagers or other devices, Online performer-to-audience multicasts or one-to-one performances can generate or respond to signals sent to or received from massagers or other devices, Online audience-to-performer participation in broadcast or one-to-one performances can generate or respond to signals sent to or received from massagers or other devices, and Others as will now be apparent to the reader.

In still other embodiments, commercially available media such as video game ROMS, audio and/or video CDs and DVDs, and electronic MP3, MPEG and other electronic media files can be encoded with a special control signal track that is extracted and broadcast by a compatible wireless controller connected to the standard outputs of a playback device. The media control signal track can thus be transmitted to cause massagers to behave in synchronization with the games, video or other material being viewed and/or listened to without requiring a specialized media player. In one exemplary embodiment, an encoded control signal in an MPEG or other digital video file can be outputted, for example through a port such as a headphone connector or other output port, to a wireless ZigBee™-compatible transmitter for controlling the massager in a desired synchronization with the media content.

Pagers, cellular phones and other portable, ZigBee™-compatible communications devices can be used to generate control signals, remotely controlling massagers directly and/or through existing national and international communication networks. Additionally, where these devices are not ZigBee™-compatible, a secondary device can be used which would connect to the portable communications device, wirelessly or otherwise as supported by the devices, and translate its signals to a ZigBee™-compatible format.

While the invention has been described with respect to certain illustrated and alternate embodiments, yet other alternative embodiments will now be apparent to the reader. Without limitation, a wide variety of other relative orientations between the base and the massager can be used so long as the desired inductive coupling for charging is obtained. Further, an inductive coupling solution can be used which does not require a specific orientation of the massager relative to the charging base. Different types of energetic coupling, such as capacitive coupling, may be used to charge the massager power source.

The massager 1312 can incorporate one or a plurality of different motive sources, for example using solenoids, piezoelectric devices, shape-memory alloys, and other sources of motion, vibratory or otherwise. The motions imparted by these motive sources can include vibratory motions, rubbing motions, tapping motions, undulating motions, swelling motions, contracting motions, bending motions and many others as will now be apparent to the reader.

The batteries 1348 and 1368 may take one or more of many well-known forms, configurations and/or shapes. Multiple batteries may be used within one or each of the remote control 1330 and massager 1312. The benefits of the wireless control functionality may be recognized using a non-rechargeable battery. Similarly, the benefits of the rechargeable battery systems may be recognized in the absence of wireless remote control operation.

Different methods can be used for the assembly or construction of the vibrator and different types of materials can be employed in the construction of the vibrator. The outer skin may be replaced with a localized area of soft material such as a silicone, thermoplastic elastomer (TPE), thermoplastic urethane (TPU) or another material with desirable properties such as tactile quality, bio-compatibility, durability, and ability to bond to the material of parts 1312A and 1312B, or may be omitted altogether.

The massager 1312 can take many different aesthetic and/or functional shapes or forms, for example, forms which are larger or smaller in scale, forms which incorporate different contours, or forms which are in configurations which are wearable on the body, mountable on surfaces, etc. The massager 1312 can incorporate sensors such as heart rate, galvanic skin response (GSR), or other types now apparent to the reader to supply information to a network of devices. The massager 1312 can incorporate LEDs, electroluminescent panels, or other forms of additional illumination for practical or aesthetic purposes. The massager 1312 can incorporate rare earth, ferrous, electro- or other types of magnets, such as those types of magnets that are believed to stimulate circulation and have a positive therapeutic effect on the body. In addition to the exothermic heat function described above, massager 1312 can incorporate a heating functionality by employing one or more infrared emitters or other electrical or chemical sources of warmth.

In other embodiments, the soft over-mold skin 1313 is formed to be changeable, for example through user removal and replacement over the underlying plastic form, so as to inexpensively provide different aesthetic and functional models of the massager for the user. The massager may or may not incorporate cosmetic details such as the metal band 1318.

Numerous alternative configurations of remote control 1330 are possible. For example:

The remote control can incorporate one or a plurality of different sources of power.

The remote control can incorporate one or a plurality of different means of user interaction, including audio speakers, vibrating motors, or different means of illumination.

Different methods can be used for the assembly or construction the remote control.

Different types of materials can be employed in the construction of the remote control.

The remote control may or may not incorporate the use of an outer layer or localized area of soft material such as a silicone, TPE, or other elastomer.

The soft skin can be changed (while maintaining the same underlying plastic form) to inexpensively provide different aesthetic and functional models of the remote control.

The remote control could be made in a wearable form, for example, in a form similar to that of a bracelet or a wrist watch.

Numerous others as will now be apparent to the reader.

While the invention has been described with respect to vibrating massagers, many features and advantages of the invention are applicable to other personal use devices, particularly those involving direct contact with the human body, including but not limited to: electronic toothbrushes and other oral hygiene devices, electronic muscle stimulators such as the Tone-A-Matic™ system, electronic heating pads and blankets, electronically-controlled reclining and operating chairs, non-massaging erotic stimulators such as vacuum pumps and electrical stimulators, electronic acupuncture devices such as the Kodiak Health systems, massaging pillows cushions and pads and other personal use devices as will now be apparent to the reader. It will further be apparent that the invention is not limited to devices that contain an internal power source such as a battery, many aspects of the invention being applicable to externally powered devices such as those described above.

There has thus been provided a new and improved vibrating massager. The massager uses inductive charging, avoiding the need to deal with batteries and cords while providing a pleasant exothermic warmth. Different embodiments of sealing and skinning make the inventive massager hygienically safe and fluid- and water-resistant. Sophisticated controls provide the massager with the ability to respond to direct-mounted user controls, wireless communication controls such as remote controls and a plethora of other protocol-compatible devices, systems and media. A mating base supports the massager for inductive charging in a stable, aesthetically pleasant and safe relationship. The invention has application in the fields of medical and personal appliances, for example in the fields of health care and adult sexual devices.

While the invention has been shown and described with respect to particular embodiments, it is not thus limited. Numerous modifications, changes and improvements, within the scope of the invention, will now be apparent to the reader.

What is claimed is:

1. A personal massager apparatus, comprising:
    a vibrator for sexual stimulation, the vibrator including:
        a vibrator housing having an outer form in a configuration that is wearable on a human body and including a first operative surface and a second operative surface that are shaped for different types of contact with the body to provide sexual stimulation,
        a first electric motive source contained within the vibrator housing for providing vibratory stimulation to the body through the first operative surface,
        a second electric motive source contained within the vibrator housing and adapted to be positioned on a different axis from the first electric motive source for providing vibratory stimulation to the body through the second operative surface,
        a rechargeable battery contained within the vibrator housing and connected to the first and second electric motive sources for powering the first and second electric motive sources,
        a first inductive coupler contained within the vibrator housing at least partially under the first operative surface, the first inductive coupler adapted to charge the battery,
        a flexible skin covering the outer form of the vibrator housing, including the first operative surface and the second operative surface, such that the massager is waterproof, and
        at least one user control under the flexible skin and operable through the flexible skin for controlling operation of the vibrator; and
    a base comprising:
        a base housing having a first recess adapted to receive the first operative surface and to support the vibrator housing for charging at least partially through the flexible skin covering the first operative surface,
        a power connector at least partially contained within the base housing, and a second inductive coupler contained within the base housing at the first recess, the second inductive coupler powered through the power connector and positioned so as to couple electromagnetically across a distance between the first inductive coupler and the second inductive coupler at least partially through the flexible skin covering the first operative surface to charge the rechargeable battery.

2. The personal massager apparatus of claim 1 wherein the vibrator housing is sealed by ultrasonic welding and is further sealed by the flexible skin covering the outer form of the vibrator housing, and wherein the flexible skin is made of a bio-compatible silicone material.

3. The personal massager apparatus of claim 1, wherein the flexible skin covers at least 90% of the outer form of the vibrator housing.

4. The personal massager apparatus of claim 1, wherein the flexible skin covers 100% of the outer form of the vibrator housing.

5. The personal massager apparatus of claim 1, further comprising:
a remote control for controlling operation of the vibrator, the remote control having an ovoid shape with at least one flat surface.

6. The personal massager apparatus of claim 1, further comprising:
a remote control for controlling operation of the vibrator, the remote control configured to control each of the first and second motive sources separately.

7. The personal massager apparatus of claim 1, further comprising:
a remote control for controlling operation of the vibrator, the remote control configured with at least one button that, when pressed by a user, causes the vibrator to cycle through different vibration configurations.

8. The personal massager apparatus of claim 1, further comprising:
a remote control for controlling operation of the massager, the remote control having a wearable form.

9. The personal massager apparatus of claim 8, wherein the remote control is a wrist watch or a bracelet.

10. The personal massager apparatus of claim 1, wherein the first and second electric motive sources are motors positioned at opposite ends of the vibrator.

11. The personal massager apparatus of claim 1, wherein the rechargeable battery, the first inductive coupler, and the second inductive coupler are positioned to generate heat palpable on the surface of the vibrator housing when the vibrator is positioned on the base housing to charge the rechargeable battery.

12. The personal massager apparatus of claim 1, wherein the first recess of the base housing is an ovoid indentation in the base housing for receiving an end of the vibrator.

13. The personal massager apparatus of claim 1, wherein the at least one user control is a button protruding from the vibrator underneath the flexible skin that is molded over the vibrator housing, the button operable by the user pressing the button through the flexible skin covering the button.

14. The personal massager apparatus of claim 1, further comprising an enclosure configured to enclose the vibrator within, the enclosure providing privacy and allowing for travel with the personal massager apparatus.

15. The personal massager apparatus of claim 1, wherein the base further comprises a container that encloses the vibrator and comprises an LED.

16. The personal massager apparatus of claim 1, further comprising a second recess in the base housing, the second recess adapted to receive the second operative surface and to support the vibrator housing, wherein the first and second recesses are configured to support and guide the vibrator into a specific orientation that optimizes inductive coupling between the first and second inductive couplers.

17. The personal massager apparatus of claim 16, wherein the first recess matches a shape of the first operative portion of the vibrator housing, and the second recess matches a shape of the second operative portion of the vibrator housing.

18. The personal massager apparatus of claim 17, wherein the first and second recesses are shaped such that the vibrator can only fit in the base in a proper orientation for inductive coupling between the first and second inductive couplers.

19. The personal massager apparatus of claim 1, wherein the first recess is configured to support the vibrator standing vertically in the base.

20. The personal massager apparatus of claim 1, wherein the personal massager apparatus comprises an LED that illuminates to indicate that the vibrator is placed on the base in the proper position.

21. The personal massager apparatus of claim 1, wherein the first and second inductive couplers are wound inductive coils, and wherein the first recess of the base is positioned such that the second inductive coupler is wound around a portion of the first recess to provide closer alignment between the first and second inductive couplers when the vibrator is positioned on the base.

22. The personal massager apparatus of claim 1, wherein, when the vibrator is on the base, the vibrator is positioned in the first recess such that at least a portion of the first inductive coupler is within an opening in a center of the second inductive coupler.

23. The personal massager apparatus of claim 1, wherein the vibrator housing is substantially U-shaped.

24. The personal massager apparatus of claim 1, wherein the first and second electric motive sources are configured such that a motion imparted by the first electric motive source and the second electric motive source is a motion selected from a group consisting of: vibratory motion, rubbing motion, tapping motion, undulating motion, swelling motion, contracting motion, bending motion, and pulsing motion.

25. The personal massager apparatus of claim 1, wherein the first and second electric motive sources are configures such that a vibration of the first electric motive source and a vibration of the second electric motive source produce positive interference.

26. The personal massager apparatus of claim 1, wherein the at least one user control is configured to operate with preset vibration patterns such that the first and second electric motive sources provide vibrations according to the preset vibration patterns.

27. The personal massager apparatus of claim 1, wherein the vibrator housing includes an antenna.

28. The personal massager apparatus of claim 1, further comprising a program configured to be executed on a phone and providing a graphical user interface for interaction with the vibrator.

29. The personal massager apparatus of claim 28, wherein the program includes instructions for generating user-programmed signals usable to interact with the vibrator.

30. The personal massager apparatus of claim 28, wherein the program includes instructions for one-to-one performances that generate signals sent to the vibrator.

31. The personal massager apparatus of claim 28, wherein the program includes instructions to access special vibration patterns.

32. A personal massager apparatus, comprising:
- a vibrator for sexual stimulation, the vibrator including:
  - a vibrator housing having an outer form in a configuration that is wearable on a human body and including a first operative surface and a second operative surface that are shaped for different types of contact with the body to provide sexual stimulation,
  - a first electric motive source contained within the vibrator housing for providing vibratory stimulation to the body through the first operative surface,
  - a rechargeable battery contained within the vibrator housing and connected to the first electric motive source for powering the first electric motive source,
  - a first inductive coupler contained within the vibrator housing at least partially under the first operative surface, the first inductive coupler adapted to charge the battery,
  - a flexible skin covering the outer form of the vibrator housing, including the first operative surface and the second operative surface, such that the massager is waterproof, and
  - at least one user control under the flexible skin and operable through the flexible skin for controlling operation of the vibrator; and
- a base including:
  - a base housing having a first recess adapted to receive the first operative surface and to support the vibrator housing for charging at least partially through the flexible skin covering the first operative surface,
  - a power connector at least partially contained within the base housing, and
  - a second inductive coupler contained within the base housing at the first recess, the second inductive coupler powered through the power connector and positioned so as to couple electromagnetically across a distance between the first inductive coupler and the second inductive coupler at least partially through the flexible skin covering the first operative surface to charge the rechargeable battery.

33. The personal massager apparatus of claim 32 wherein the vibrator housing is sealed by ultrasonic welding and is further sealed by the flexible skin covering the outer form of the vibrator housing, and wherein the flexible skin is made of a bio-compatible silicone material.

34. The personal massager apparatus of claim 32, wherein the flexible skin covers 100% of the outer form of the housing.

35. The personal massager apparatus of claim 32, further comprising:
- a remote control for controlling operation of the massager, the remote control having an ovoid shape with at least one flat surface.

36. The personal massager apparatus of claim 32, further comprising:
- a remote control for controlling operation of the massager, the remote control configured with at least one button that, when pressed by a user, causes the massager to cycle through different vibration configurations.

37. The personal massager apparatus of claim 32, further comprising:
- a remote control for controlling operation of the massager, the remote control having a wearable form comprising a wrist watch or bracelet.

38. The personal massager apparatus of claim 32, wherein the rechargeable battery, the first inductive coupler, and the second inductive coupler are positioned to generate heat palpable on the surface of the vibrator housing when the vibrator is positioned on the base housing to charge the rechargeable battery.

39. The personal massager apparatus of claim 32, wherein the first recess of the base housing is an ovoid indentation in the base housing for receiving and end of the vibrator.

40. The personal massager apparatus of claim 32, wherein the at least one user control is a button protruding from the vibrator underneath the flexible skin that is molded over the vibrator housing, the button operable by the user pressing the button through the flexible skin covering the button.

41. The personal massager apparatus of claim 32, further comprising an enclosure configured to enclose the vibrator within, the enclosure providing privacy and allowing for travel with the personal massager apparatus.

42. The personal massager apparatus of claim 32, wherein the base further comprises a container that encloses the vibrator and comprises an LED.

43. The personal massager apparatus of claim 32, further comprising a second recess in the base housing, the second recess adapted to receive the second operative surface and to support the vibrator housing, wherein the first and second recesses are configured to support and guide the vibrator into a specific orientation that optimizes inductive coupling between the first and second inductive couplers.

44. The personal massager apparatus of claim 43, wherein the first recess matches a shape of the first operative portion of the vibrator housing, and the second recess matches a shape of the second operative portion of the vibrator housing.

45. The personal massager apparatus of claim 44, wherein the first and second recesses are shaped such that the vibrator can only fit in the base in a proper orientation for inductive coupling between the first and second inductive couplers.

46. The personal massager apparatus of claim 32, wherein the first recess is configured to support the vibrator standing vertically in the base.

47. The personal massager apparatus of claim 32, wherein the personal massager apparatus comprises an LED that illuminates to indicate that the vibrator is placed on the base in the proper position.

48. The personal massager apparatus of claim 32, wherein the first and second inductive couplers are wound inductive coils, and wherein the first recess of the base is positioned such that the second inductive coupler is wound around a portion of the first recess to provide closer alignment between the first and second inductive couplers when the vibrator is positioned on the base.

49. The personal massager apparatus of claim 48, wherein, when the vibrator is on the base, the vibrator is positioned in the first recess such that at least a portion of the first inductive coupler is within an opening in a center of the second inductive coupler.

50. The personal massager apparatus of claim 32, wherein the vibrator housing is substantially U-shaped.

51. The personal massager apparatus of claim 32, wherein the first electric motive source is configured such that a motion imparted by the first electric motive source is a motion selected from a group consisting of: vibratory motion, rubbing motion, tapping motion, undulating motion, swelling motion, contracting motion, bending motion, and pulsing motion.

52. The personal massager apparatus of claim 32, wherein the at least one user control is configured to operate with preset vibration patterns such that the first electric motive source provides vibrations according to the preset vibration patterns.

53. The personal massager apparatus of claim 32, wherein the vibrator housing includes an antenna.

54. The personal massager apparatus of claim 32, further comprising a program configured to be executed on a phone and providing a graphical user interface for interaction with the vibrator.

55. The personal massager apparatus of claim 54, wherein the program includes instructions for generating user-programmed signals usable to interact with the vibrator.

56. The personal massager apparatus of claim 54, wherein the program includes instructions for one-to-one performances that generate signals sent to the vibrator.

57. The personal massager apparatus of claim 54, wherein the program includes instructions to access special vibration patterns.

* * * * *